(12) United States Patent
Lu et al.

(10) Patent No.: US 12,432,526 B2
(45) Date of Patent: *Sep. 30, 2025

(54) SYSTEMS AND METHODS FOR MULTICARRIER PHASE-BASED LOCALIZATION

(71) Applicant: ZaiNar, Inc., Redwood City, CA (US)

(72) Inventors: Jonathan Lu, Redwood City, CA (US); Mainak Chowdhury, Redwood City, CA (US); Philip A. Kratz, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/211,151

(22) Filed: Jun. 16, 2023

(65) Prior Publication Data

US 2023/0413013 A1    Dec. 21, 2023

Related U.S. Application Data

(63) Continuation of application No. 17/871,771, filed on Jul. 22, 2022, now Pat. No. 11,722,851, which is a
(Continued)

(51) Int. Cl.
*H04W 4/029* (2018.01)
*G01S 5/02* (2010.01)
(Continued)

(52) U.S. Cl.
CPC ............. *H04W 4/029* (2018.02); *G01S 5/021* (2013.01); *G01S 5/0284* (2013.01); *G01S 5/10* (2013.01);
(Continued)

(58) Field of Classification Search
CPC ... H04W 4/029; H04W 56/001; H04W 64/00; H04L 5/0053; H04L 5/007; H04L 5/0051; G01S 5/0284; G01S 5/10; G01S 5/021
See application file for complete search history.

(56) References Cited

U.S. PATENT DOCUMENTS

| | | | |
|---|---|---|---|
| 8,026,850 B2* | 9/2011 | Seong | G01S 5/14 342/387 |
| 9,194,936 B1* | 11/2015 | Keegan | H04L 27/28 |

(Continued)

*Primary Examiner* — Muthuswamy G Manoharan
(74) *Attorney, Agent, or Firm* — Run8 Patent Group, LLC; Peter Miller

(57) ABSTRACT

A method for calculating a time-of-arrival of a multicarrier uplink signal includes: accessing a multicarrier reference signal including a subcarrier reference signal for each subcarrier frequency in a set of subcarrier frequencies; receiving the multicarrier uplink signal transmitted from a user device, the multicarrier uplink signal including a subcarrier uplink signal for each subcarrier frequency in the set of subcarrier frequencies; for each subcarrier frequency in the set of subcarrier frequencies, calculating a phase difference, in a set of phase differences, between the subcarrier reference signal for the subcarrier frequency and a subcarrier uplink signal for the subcarrier frequency; calculating a time-of-arrival of the multicarrier uplink signal at the transceiver based on the set of adjusted phase differences; and transmitting the time-of-arrival of the multicarrier uplink signal to a remote server.

11 Claims, 13 Drawing Sheets

Related U.S. Application Data continuation of application No. 17/379,873, filed on Jul. 19, 2021, now Pat. No. 11,425,536.

(60) Provisional application No. 63/152,780, filed on Feb. 23, 2021, provisional application No. 63/053,509, filed on Jul. 17, 2020.

(51) Int. Cl.
*G01S 5/10* (2006.01)
*H04L 5/00* (2006.01)
*H04W 56/00* (2009.01)
*H04W 64/00* (2009.01)

(52) U.S. Cl.
CPC .......... *H04L 5/0007* (2013.01); *H04L 5/0051* (2013.01); *H04L 5/0053* (2013.01); *H04W 56/001* (2013.01); *H04W 64/00* (2013.01)

(56) References Cited

U.S. PATENT DOCUMENTS

2020/0351813 A1* 11/2020 Manolakos ........... H04W 24/10
2024/0036149 A1* 2/2024 Kumar .................. G01S 5/0205

* cited by examiner

SYSTEMS AND METHODS FOR MULTICARRIER PHASE-BASED LOCALIZATION

CROSS-REFERENCE TO RELATED APPLICATIONS

This Application is a continuation application of U.S. patent application Ser. No. 17/871,771, filed on 22 Jul. 2022, which is a continuation application of U.S. patent application Ser. No. 17/379,873, filed on 19 Jul. 2021, which claims the benefit of U.S. Provisional Application No. 63/152,780, filed on 23 Feb. 2021, and U.S. Provisional Application No. 63/053,509, filed on 17 Jul. 2020, each of which is incorporated in its entirety by this reference.

TECHNICAL FIELD

This invention relates generally to the field of radio frequency localization and more specifically to a new and useful method for multicarrier phase-based localization in the field of radio frequency localization.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method for Calculating Time-of-Arrival at a Transceiver

Figure 1:
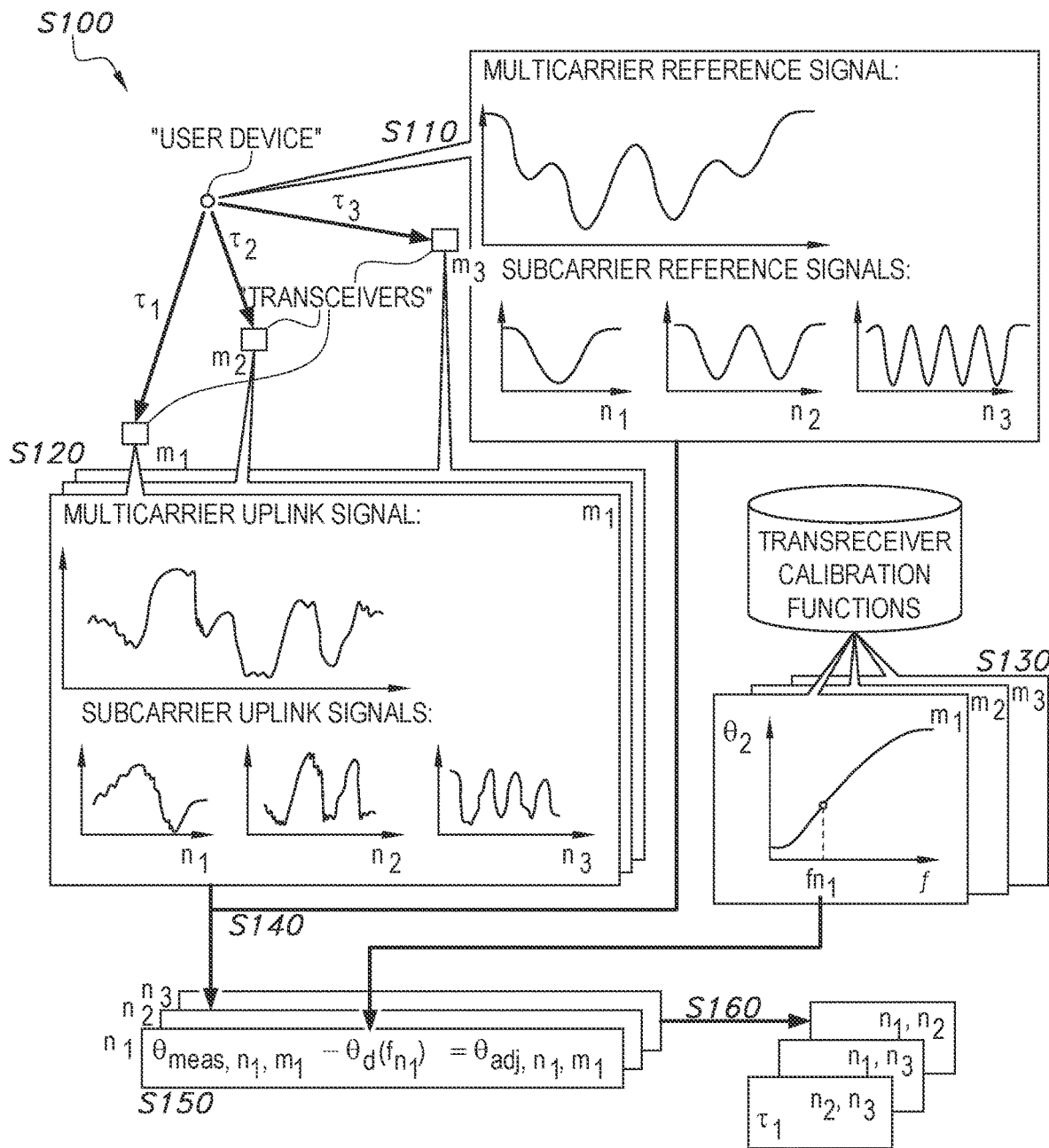
FIG. 1 is a flowchart representation of a first method.

As shown in FIG. 1, a transceiver is configured to execute a method S100 for calculating a time-of-arrival of a multicarrier uplink signal. The method S100 includes: accessing a multicarrier reference signal defining a set of subcarrier frequencies and comprising a subcarrier reference signal for each subcarrier frequency in the set of subcarrier frequencies in Block S110; receiving the multicarrier uplink signal transmitted from a user device, the multicarrier uplink signal defining the set of subcarrier frequencies and comprising a subcarrier uplink signal for each subcarrier frequency in the set of subcarrier frequencies in Block S120; accessing a calibration function for the transceiver representing a relationship between subcarrier frequency and phase offset in Block S130. The method S100 also includes, for each subcarrier frequency in the set of subcarrier frequencies: calculating a phase difference between the subcarrier reference signal for the subcarrier frequency and a subcarrier uplink signal for the subcarrier frequency in Block S140; and adjusting the phase difference by a frequency-dependent phase offset based on the subcarrier frequency and the calibration function of the transceiver to generate an adjusted phase difference in a set of adjusted phase differences in Block S150. The method S100 additionally includes: calculating a time-of-arrival of the multicarrier uplink signal at the transceiver based on the set of adjusted phase differences in Block S160; and transmitting the time-of-arrival of the multicarrier uplink signal to a remote server in Block S170.

One variation of the method S100 additionally includes: for each pair of subcarrier frequencies in the set of subcarrier frequencies, calculating a time-of-arrival estimate in a set of time-of-arrival estimates based on a first phase difference for a first subcarrier frequency in the pair of subcarrier frequencies, and a second phase difference for a second subcarrier frequency in the pair of subcarrier frequencies in Block S162; and calculating the time-of-arrival of the multicarrier uplink signal at the transceiver based on the set of time-of-arrival estimates in Block S164.

2. Uplink Method for Calculating a Location of a User Device

Figure 2:
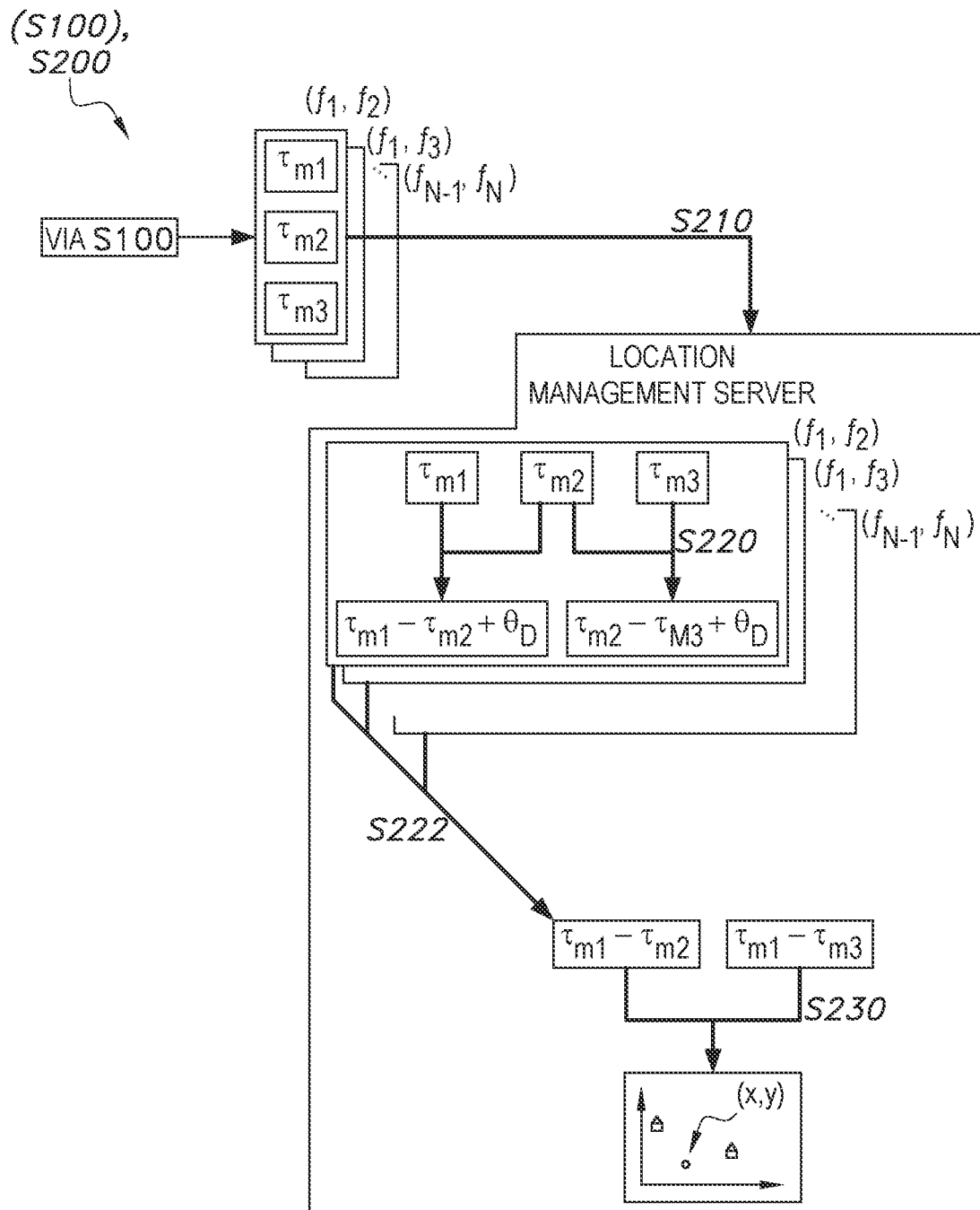
FIG. 2 is a flowchart representation of a second method.

As shown in FIG. 2, a location management server is configured to execute a method S200 for calculating a location of a user device. The method S200 includes, for each transceiver in a set of transceivers, accessing a time-of-arrival, at the transceiver, of a multicarrier uplink signal transmitted from the user device in Block S210. For the method S200, the time-of-arrival of the multicarrier uplink signal at each transceiver in the set of transceivers is calculated by: accessing a multicarrier reference signal defining a set of subcarrier frequencies and comprising a subcarrier reference signal for each subcarrier frequency in the set of subcarrier frequencies; receiving the multicarrier uplink signal defining the set of subcarrier frequencies and comprising a subcarrier uplink signal for each subcarrier frequency in the set of subcarrier frequencies; accessing a calibration function for the transceiver representing a relationship between subcarrier frequency and phase offset; for each subcarrier frequency in the set of subcarrier frequencies, calculating a phase difference between the subcarrier reference signal for the subcarrier frequency and a subcarrier uplink signal for the subcarrier frequency and adjusting the phase difference by a frequency-dependent phase offset based on the subcarrier frequency and the calibration function of the transceiver to generate an adjusted phase difference in a set of adjusted phase differences for the multicarrier uplink signal; and calculating the time-of-arrival of the multicarrier uplink signal at the transceiver based on the set of adjusted phase differences for the multicarrier uplink signal. The method S200 also includes: calculating a set of time-differences-of-arrival based on the time-of-arrival of the multicarrier uplink signal at each transceiver in the set of transceivers in Block S220; calculating an uplink location estimate of the user device via multilateration based on the set of time-differences-of-arrival and a known location of each transceiver in the set of transceivers in Block S230.

3. Downlink Method for Calculating a Location of a User Device

Figure 3:
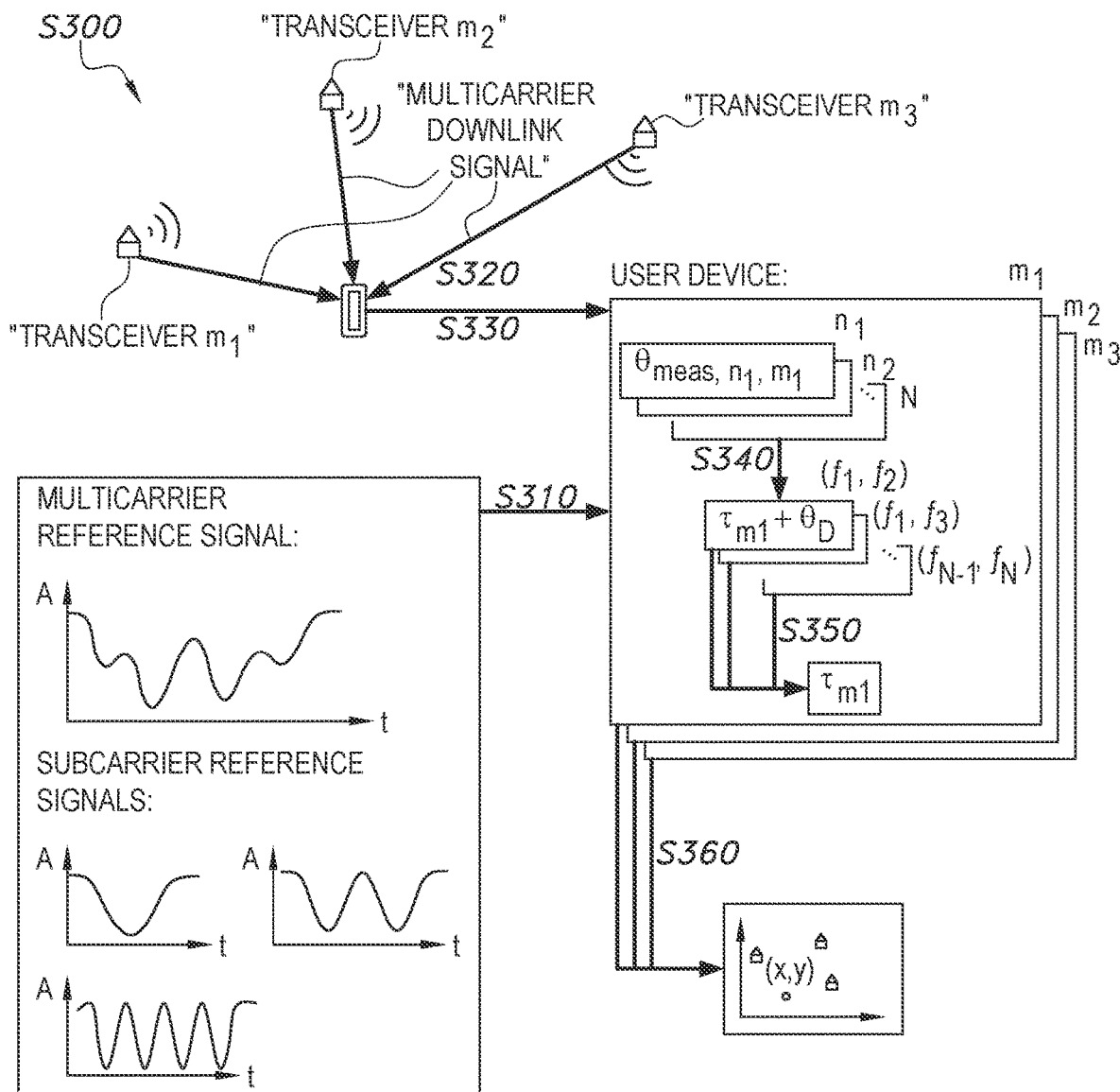
FIG. 3 is a flowchart representation of a third method.

As shown in FIG. 3, a user device is configured to execute a method S300 for localizing the user device relative to a set of transceivers. The method S300 includes: accessing a multicarrier reference signal defining a set of subcarrier frequencies and comprising a subcarrier reference signal for each subcarrier frequency in the set of subcarrier frequencies in Block S310; receiving a set of multicarrier downlink signals, each multicarrier downlink signal in the set of multicarrier downlink signals transmitted by a transceiver in a set of transceivers, defining the set of subcarrier frequencies, and comprising a subcarrier downlink signal for each subcarrier frequency in the set of subcarrier frequencies in Block S320. The method S300 also includes, for each multicarrier downlink signal in the set of multicarrier downlink signals: for each subcarrier frequency in the set of subcarrier frequencies, calculating a phase difference between the subcarrier reference signal for the subcarrier frequency and a subcarrier downlink signal for the subcarrier frequency in Block S330; for each pair of subcarrier frequencies in the set of subcarrier frequencies, calculating a time-of-arrival estimate in a set of time-of-arrival estimates based on a first phase difference for a first subcarrier frequency in the pair of subcarrier frequencies and a second phase difference for a second subcarrier frequency in the pair of subcarrier frequencies in Block S340; and calculating the time-of-arrival of the received multicarrier signal at the receiving device based on the set of time-of-arrival estimates in Block S350. The method S300 additionally includes calculating a downlink location estimate of the user device based on the time-of-arrival of each received multicarrier signal in the set of received multicarrier signals and a set of known locations of the set of transceivers in Block S360.

4. Applications

Generally, a network (e.g., a telecommunication network, a local area wireless network), includes a location management server, a set of transceivers (e.g., base stations, wireless nodes, cellular sites), and at least one user device (e.g., user equipment such as an IoT device, a network-capable smartphone, tablet, laptop computer) and is configured to cooperatively execute the method S100 at each of the set of transceivers and the method S200, at the location management server, in order to calculate a location estimate for the user device with a high degree of accuracy (e.g., to within one meter). Additionally or alternatively, a user device in the network can execute the method S300 to calculate a location estimate for itself relative to the set of transceivers (characterized by a similar degree of accuracy) and can report this downlink location estimate to the location management server.

The network leverages—via the methods S100, S200, and S300—a multicarrier-based communication protocol, such as orthogonal frequency division multiplexing (hereinafter "OFDM") as employed in a fourth generation (hereinafter "4G") or fifth generation (hereinafter "5G") mobile telecommunication network to localize any user device operating on the network based on: multicarrier phase information extracted from a multicarrier uplink signal transmitted from the user device and received by the set of transceivers (for the methods S100 and S200); and/or multicarrier phase information extracted from a multicarrier downlink signal transmitter from the set of transceivers and received by the user device (for the method S300). Thus, the network can execute phase-based localization of user devices operating on the network without occupying additional bandwidth via radio-frequency (hereinafter "RF") carrier frequency hopping, without modifications to the hardware of the transceiver or the user device, and without requiring substantive modifications or additions to the communication protocol of the network.

In particular, each transceiver in the set of transceivers can execute the method S100 upon receiving a multicarrier uplink signal from a user device to estimate an accurate (e.g., to within 10 nanoseconds) time-of-arrival (hereinafter "TOA") of the multicarrier uplink signal at the transceiver. More specifically, the transceiver can, for each subcarrier signal of the multicarrier uplink signal: calculate a subcarrier phase difference between the subcarrier uplink signal and a subcarrier reference signal of the same subcarrier frequency; and adjust the subcarrier phase difference to account for frequency-dependent phase offsets incurred due to the receive chain of the transceiver. The transceiver can then, for each unique pair of subcarrier phase differences, calculate a TOA estimate by canceling out constant phase offsets affecting both subcarrier phase differences in the pair. Because the transceiver can generate many TOA estimates for the multicarrier uplink signal, the transceiver can detect and eliminate frequency-selective phase distortion (hereinafter "phase distortion") from these estimates via statistical estimation (e.g., regression, averaging, weighted averaging), thereby further increasing the accuracy of the result TOA estimate. Thus, by executing Blocks of the method S100, each transceiver can cancel out or otherwise mitigate source phase offsets that decrease the accuracy of the TOA estimate.

Once each transceiver has calculated a TOA of the subcarrier uplink signal via the method S100, the location management server can execute Blocks of the method S200 to access the TOAs from each transceiver in the set of transceivers and calculate a set of time differences of arrival (hereinafter "TDOAs") between the transceivers, thereby canceling out additional phase offsets incurred, for example, by sampling time offsets between the user device and the set of transceivers. Upon calculating a set of TDOAs (e.g., three or four TDOAs) for the multicarrier uplink signal, the location management server can calculate a location (in two-dimensional or three-dimensional space) of the user device via TDOA multilateration based on a set of known locations of the transceivers and the set of TDOAs.

Because each transceiver can extract phase information from baseband subcarrier signals of a multicarrier signal instead of an RF carrier signal, each transceiver can extract a large quantity of phase information (e.g., proportional to the number of subcarrier signals comprising the multicarrier signal) from a single multicarrier uplink signal that, in a frequency hopping localization scheme, requires multiple successive signals characterized by variable RF carrier frequencies. Thus, the method S100 can be executed within a short timeframe (e.g., a single signal duration plus processing time) and a small bandwidth (e.g., the bandwidth occupied by the single multicarrier signal).

Additionally, as described above, by extracting a variety of concurrent (or shortly successive within a few microseconds) phase differences from the set of subcarrier signals comprising the multicarrier signal, each transceiver can mitigate the effects, on the TOA estimate, of phase distortion in these subcarrier signals. For example, a single multicarrier signal within a network communication protocol such as 5G can include upwards of 1200 subcarrier signals within a single multicarrier signal, while the transceiver can calculate a TOA for a multicarrier signal based on only two subcarrier phase differences. Thus, the system can: calculate multiple TOA estimates for the multicarrier signal, which can each be affected by phase distortion in the underlying phase difference measurements; and aggregate these TOAs into a single, more accurate TOA for each transceiver.

Furthermore, by leveraging scheduled multicarrier signals specified by the communication protocol of the network, the network can execute the methods S100, S200, and/or S300, without any additional overhead in the communication protocol demanded. For example, the network can be a 5G telecommunication network including the location management server executing a location management function (hereinafter "LMF") incorporating Blocks of the method S200 and interfacing with a set of 5G base stations (i.e., gNBs, wireless nodes) operating as the set of transceivers to execute Blocks of the method S100. In this example, the network can leverage radio resource control (hereinafter "RRC") signaling such as sounding reference signals (hereinafter "SRS") transmitted from a 5G-capable user device to the set of 5G base stations as the multicarrier uplink signal and can leverage the new radio positioning protocol A (hereinafter "NRPPa") to communicate TOA data (e.g., $\tau_m$), phase data (e.g., $\theta_{meas,n,m}$), and/or raw waveform data of the multicarrier signal to the LMF for processing according to Blocks of the method S200. Therefore, in this example, a 5G network can enable sub-one-meter localization of user devices on the 5G network by using the TOA data element supported in NRPPa or minimally modifying NRPPa to transfer phase data and/or raw waveform data between the 5G base stations and the location management server and by updating the software of the LMF to execute the method S200.

In another example, the network is configured to localize a user device in the network based on downlink signals, by executing Blocks of the method S300 at the user device. For example, in a 5G telecommunication network, a user device can leverage downlink signals, such as positioning reference signals (hereinafter "PRS")— transmitted to the user device from the base stations in the 5G network on different frequency-time resources. The user device can then execute Blocks of the method S300 to calculate its location relative to the base stations or transmit relative TDOA data (e.g., via reference signal time difference, hereinafter RSTD), phase data, and/or waveform data to the LMF via LTE positioning protocols (hereinafter "LPP") or the LPP extension (hereinafter "LPPe") for further processing according to Blocks of the method S100.

In yet another example, the network can operate according to both the uplink (S100 and S200) and downlink (S300) variations described above. The network can then execute super-resolution algorithms (based on the frequency separation between the uplink and downlink signals) to further improve localization accuracy.

Thus, the network can adapt existing mobile communication protocols and network infrastructure to execute Blocks of the methods S100, S200, S300 by modifying existing protocols to support additional data fields for the TOA data, phase data, and/or waveform data generated according to Blocks of the methods S100, S200, and S300.

Generally, Blocks of the method S100 are described herein as being executed by a transceiver in a set of transceivers. However, in some variations, Blocks of the method S100 can be executed by other entities within the network (e.g., one or more remote servers) provided that the transceiver transmits the prerequisite data describing the multicarrier uplink signal transmitted by the user device to each transceiver in the set of transceivers.

Generally, Blocks of the method S200 are described herein as being executed by a remote server or the location management server. However, in some variations, Blocks of the method S200 can be executed by multiple remote servers or by a leader transceiver operating in the network.

Generally, Blocks of the method S300 are described herein as being executed by a user device operating in the network. However, in some variations, Blocks of the method S300 can be executed by a remote server, such as the location management server or a leader transceiver, provided that the user device transmits the prerequisite data describing the multicarrier downlink signal to the remote server.

Generally, Blocks of the method S100, S200, and S300 are described herein with respect to TOAs of various signals at various devices. However, as utilized herein, a TOA can also include a known, scheduled, or characterized transmission delay (e.g., between downlink signals transmitted by separate transceivers in the set of transceivers). Thus, in Blocks of the methods S200 and S300 that include calculating a TDOA based on a set of TOAs, the location management server and the user device respectively can account for differences in transmission time between the signals for which the TOAs were calculated prior to calculating the TDOAs.

5. User Device

Generally, a transceiver executes Blocks of the method S100 and the location management server executes Blocks of the method S200 to localize a user device operating within the network based on a multicarrier uplink signal transmitted from a user device and received at a set of transceivers in order to calculate a location estimate for the user device. More specifically, the user device can be any computing device including a transceiver capable of transmitting multicarrier signals according to the communication protocol of the network. For example, the network can localize user devices such as IoT (Internet of Things) devices, smartphones, smartwatches, tablets, laptop computers, or any other network-capable computing device.

In one implementation, the user device includes a network-capable transceiving device that does not include a global navigation satellite system (hereinafter GNSS) chip. In this implementation, the network can localize the user device without utilizing GNSS and based on the multicarrier uplink signal transmitted by the user device.

In another implementation, the user device includes any computational device capable of operating in a network according to the wireless communication protocol of the network. More specifically, the user device can include any user equipment capable of transmitting a multicarrier uplink signal that is received by a minimum number of base stations in the network necessary for multilateration (e.g., three transceivers for two-dimensional localization, four transceivers for three-dimensional localization).

In one example, the user device includes any class of user equipment (UE) operating in a 5G network and in communication with at least three base stations (i.e., gNBs).

6. Transceivers

Figure 4:
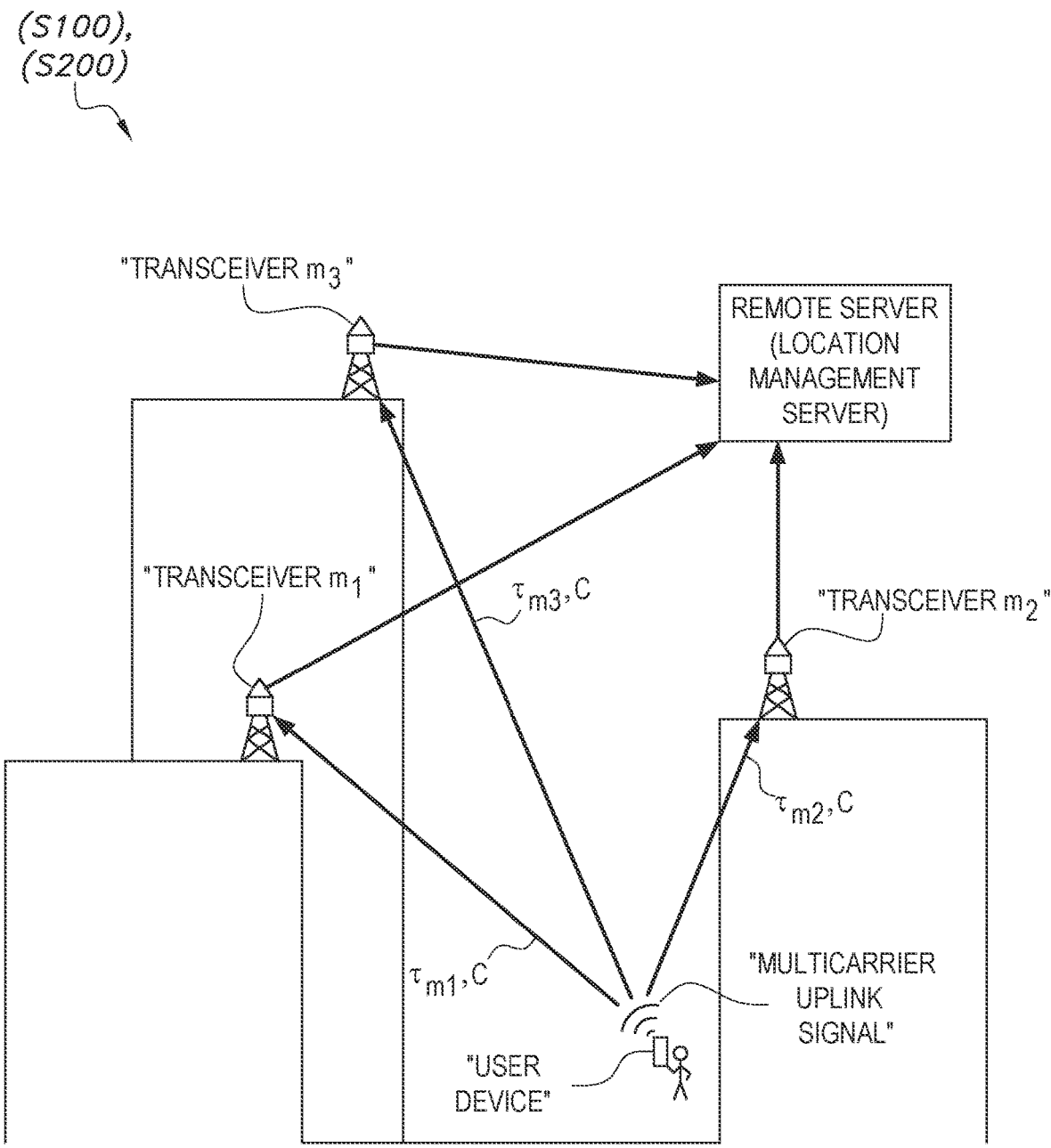
FIG. 4 is a schematic representation of a network.

As shown in FIG. 4, the network includes a set of transceivers communicating with at a particular user device to acquire raw multicarrier waveform data describing the multicarrier uplink signal transmitted from the user device such that by executing Blocks of the method S100 at each transceiver and by executing Blocks of the method S200 at the location management server, the network can localize the user device. Additionally, each transceiver in the set of transceivers can transmit (directly or via another network protocol) calculated TOA estimates, phase information, and/or raw waveform data associated with the multicarrier uplink signal to the location management server. More specifically, each transceiver in the set of transceivers can include a wireless node or base station of the network. Thus, the set of transceivers, as referred to herein, can provide telecommunication services to the user device in addition to executing Blocks of the method S100.

In one implementation, in order to localize a user device according to Blocks of the method S100, the set of transceivers can also be time synchronized to within 10 nanoseconds (e.g., via GPS time synchronization) and can include accurate clocks capable of maintaining this level of time synchronization.

In another implementation, the set of transceivers can include a set of user devices served by the network. In this implementation, the set of transceivers can receive a multicarrier sidelink signal from a transmitting user device in the network and can communicate with the location management server according to Blocks of the methods S100 and S200 to localize a transmitting user device in the network. In this implementation, the location management server can continuously track the position of each transceiver executing this sidelink variation of the method S100 in order to effectively localize the transmitting user device in the network.

6.1 Time Synchronization and Sampling Time Offset

Generally, each transceiver in a set of transceivers receiving the multicarrier uplink signal and executing Blocks of the method S100 can include time synchronized clocks. More specifically, each transceiver in the set of transceivers can execute a time synchronization protocol (e.g., via GPS time synchronization, a two-way ranging and time synchronization protocol, the time synchronization protocol described in U.S. Pat. No. 10,833,840). Additionally, each transceiver in the set of transceivers can access a calibrated sampling time offset that characterizes the sampling time offset of the transceiver relative to a reference time. Thus, each transceiver in the set of transceivers can adjust a calculated TOA for the multicarrier reference signal for phase offsets caused by sampling time differences between the transceiver and other transceivers in the network.

7. Location Management Server

As shown in FIG. 4, the network includes a location management server in communication with multiple transceivers and configured to execute Blocks of the method S200. More specifically, the location management server can include multiple remote servers cooperating to calculate a location estimate for the user device based on TOAs of the multicarrier uplink signal calculated by a set of transceivers. Thus, the location management server is configured to aggregate these TOAs in order to generate a location estimate for the user device, and/or track the location of the user device over time.

In one implementation, the location management server operates in a 5G telecommunication network and executes a location management function (hereinafter "LMF") in accordance with 5G standards. By executing the LMF, the location management server can receive TOA data (e.g., a TOA, a set of TOA estimates, and/or raw waveform data) from each transceiver in the set of the transceivers via the NRPPa protocol. Thus, each transceiver can transmit a TOA calculated by the transceiver associated with the multicarrier uplink signal to a location management server configured to calculate a location of the user device via multilateration and based on a set of TOAs of the multicarrier uplink signal at a set of transceivers comprising the transceiver, the set of times-of-arrival comprising the time-of-arrival of the multicarrier uplink signal at the transceiver.

8. Uplink Protocol

Generally, the network can execute an uplink localization protocol including Blocks of the method S100 executed by each transceiver in a set of transceivers and Blocks of the method S200 executed by the location management server further described below.

In one implementation, the location management server can initiate the uplink protocol by: accessing a prior location estimate of a user device; and selecting a set of transceivers within a threshold distance of the prior location estimate (e.g., calculated based on a receptive range of a multicarrier uplink signal transmitted by the user device) based on the known location of each transceiver in the set of transceivers. The location management server can then request TOA data associated with the multicarrier uplink signal from the set of selected transceivers.

Upon selection of the set of transceivers, each transceiver in the set of transceivers can select a channel (e.g., an orthogonal frequency division multiple access, hereinafter OFDMA, resource) in the wireless protocol executed by the transceiver with which to receive a multicarrier uplink signal from the user device. Additionally, the network can communicate the selected channel information to the user device.

In one implementation, the location management server can prompt the user device and the set of transceivers to initiate the uplink protocol periodically or on a predetermined schedule. In one example, in which the location management server is executing an LMF in accordance with the 5G standards, the location management server can: in response to receiving a location request, for a particular user device, from the access and mobility management function (hereinafter "AMF"), request location measurements from the set of transceivers (i.e., gNBs). The location management server can then receive TOAs, TOA estimates, and/or raw waveform data from the set of transceivers associated with the multicarrier uplink signal transmitted by the user device. In this example, upon calculating a location estimate for the user device, the location management server can transmit a location response to the AMF.

Generally, Blocks of the method S100 are described below from the perspective of a single transceiver in the set of transceivers. However, each transceiver selected to receive the multicarrier uplink signal can independently execute Blocks of the method S100 in order to calculate a TOA for the multicarrier uplink signal at the transceiver.

Generally, Blocks of the method S200 are described below from the perspective of the location management server in (direct or indirect) communication with a set of transceivers. However, the set of transceivers can also refer to a subset of transceivers in the network that have received the multicarrier uplink signal transmitted by a single client device.

Generally, Blocks of the method S100 and S200 are described herein as being executed by a transceiver and a location management server respectively. However, Blocks S120, S130, S140, S150, and S160 can be executed by the location management server upon receipt of raw waveform data or partially processed waveform data from each transceiver in the set of transceivers.

8.1 Multicarrier Reference Signal

Generally, the transceiver can access a multicarrier reference signal defining a set of subcarrier frequencies and including a subcarrier reference signal for each subcarrier frequency in the set of subcarrier frequencies in Block S110. More specifically, the transceiver can access a multicarrier modulated signal including a set of subcarrier signals, each characterized by a subcarrier frequency separated from a spectrally adjacent subcarrier frequency by frequency interval, $\Delta f$. Additionally, the transceiver can access a multicarrier reference signal that encodes a sequence of digital symbols that identifies the user device, thereby enabling the transceiver to identify the user device being localized via execution of Blocks of the method S100 in order to respond to requests by the location management server for the location of the user device and to access a multicarrier reference signal matching the multicarrier uplink signal transmitted by the user device. Alternatively, the transceiver can maintain an identifier table relating user device identifiers to particular channels or slots within which the transceiver receives each multicarrier uplink signal. In this implementation, the transceiver can access a multicarrier reference signal corresponding to the device identifier in advance of receiving the corresponding multicarrier uplink signal without necessitating interpretation of the user device identifier from the multicarrier uplink signal itself. Thus, the transceiver can disambiguate multicarrier uplink signals received from multiple user devices and match each multicarrier uplink signal to a corresponding multicarrier reference signal in order to generate a set of phase differences between the multicarrier uplink signal and the multicarrier reference signal, as is further described below.

In one example, the transceiver accesses a RRC reference signal or pilot signal in a 5G communication protocol, such as an SRS, which will be transmitted from the user deice. In this example, the signal is an OFDM reference signal with a $\Delta f$ of fifteen kilohertz. However, the transceiver can access any other multicarrier reference signal, including those of differing frequencies in the passband.

Generally, the multicarrier reference signal can be modeled as a sum of N subcarrier reference signals, n, including complex sinusoids of subcarrier frequency $f_n$ for each symbol in a sequence of digital symbols:

$$s(t) = \sum_{n=1}^{N} A_n e^{j(2\pi f_n t + \theta_n)}$$

wherein $A_n$ is the amplitude and $\theta_n$ is the additional phase of each subcarrier reference signal. Thus, as utilized herein, n refers to a specific subcarrier reference signal, subcarrier uplink signal, or subcarrier downlink signal in the set of subcarrier signals, N.

8.2 Multicarrier Uplink Signal

Generally, the transceiver can receive the multicarrier uplink signal transmitted from a user device, the multicarrier uplink signal defining the set of subcarrier frequencies and including a subcarrier uplink signal for each subcarrier frequency in the set of subcarrier frequencies in Block S120. More specifically, the transceiver can receive (e.g., via transmission from a user device) a multicarrier uplink signal including the same sequence of digital symbols as the multicarrier reference signal and including a set of subcarrier uplink signals characterized by the same subcarrier frequencies as the set of reference subcarrier frequencies in Block S120. In particular, the multicarrier uplink signal is a copy of the multicarrier reference signal up-converted to a RF carrier frequency and transmitted by the user device over a wireless channel during a scheduled time slot. Thus, the transceiver can directly compare each subcarrier phase of the multicarrier uplink signal to a corresponding subcarrier phase of the multicarrier reference signal, as is further described below.

During transmission between the user device and the transceiver, m, in a set of transceivers, M, the multicarrier uplink signal is delayed for some propagation time (or TOA), $T_m$. Thus, by extracting the phase differences, $\theta_{\tau,n,m}$ between each subcarrier uplink signal in the set of subcarrier uplink signals and a corresponding subcarrier reference signal in the set of subcarrier reference signals, the network can calculate $\tau_m$ and, upon calculating $\tau_m$ for each of the set of M transceivers that received the multicarrier uplink signal from the user device, subsequently localize the user device (via Blocks of the method S200).

Generally, the multicarrier uplink signal at transceiver, m, can be modeled as follows ($A_n$ is omitted below for ease of description):

$$r_m(t) = \sum_{n=1}^{N} e^{j2\pi f_n(t-\tau_m)} \text{ or}$$

$$r_m(t) = \sum_{n=1}^{N} e^{j(2\pi f_n t + \theta_{\tau,n,m})}.$$

Additionally, the multicarrier uplink signal, $r_m(t)$, may be affected by multipath delay and therefore the signal model can be expressed as follows:

$$r_m(t) = \sum_{i=1}^{I} \sum_{n=1}^{N} \rho_i e^{j(2\pi f_n t + \theta_{\tau_i,n,m} + \theta_i)},$$

wherein I represents the total number of paths, $\rho_i$ represents the amplitude of each multipath signal, $\theta_{\tau_i,n,m}$ represents the phase delay incurred due to propagation delay of the multipath signal, and $\theta_i$ represents the additional phase incurred not from propagation delay (e.g., due to reflection and/or diffraction). Thus, in ideal conditions for which I=1, $\tau_1=\tau_m$, and $\theta_1=\theta$, $\tau_m$ can be calculated according to the equation:

$$\tau_m = -\theta_{\tau,n,m}/2\pi f_n,$$

for any subcarrier signal n. However, even in the aforementioned ideal conditions, the measured phase difference, $\theta_{meas,n,m}$, is not equal to $\theta_{\tau,n,m}$. Instead $\theta_{meas,n,m}$ can be modeled by the following equation:

$$\theta_{meas,n,m} = \theta_{\tau,n,m}(f_n,\tau_m) + \theta_{fc}(f_c,\tau_m) + \theta_c + \theta_{d,m}(f_n) + \theta_{u,m}(f_n) + \theta_{D,n},$$

where $\theta_{fc}$ represents an RF carrier phase offset, $\theta_c$ represents a constant frequency-independent phase offset, $\theta_{d,m}$ represents a deterministic frequency-dependent phase offset incurred via analog hardware components, software, and/or firmware (e.g., digital filters) of the transceiver m, $\theta_{u,m}$ represents a phase offset incurred due to sampling offset between the user device and the transceiver m, and $\theta_{D,n}$ represents frequency-selective phase distortion, which may be randomly and symmetrically distributed over the set of subcarrier frequencies or non-linear with respect to $f_n$.

Therefore, to accurately calculate the TOA of the multicarrier uplink signal at the transceiver, thereby enabling localization of the user device via Blocks of the method S200, the transceiver can characterize or eliminate each of these phase offsets according to Blocks of the methods S100.

In one example, the multicarrier uplink signal is the received baseband signal of the sounding reference signal transmitted according to the 5G telecommunication protocol. Thus, in this example, the transceiver can receive a sounding reference signal in a wireless telecommunication protocol transmitted by the user device.

In another example, the multicarrier uplink signal is the received baseband signal of an OFDM signal. More specifically, in this example, the transceiver can receive a multicarrier uplink signal including an OFDM signal. Thus, in this example, the multicarrier uplink signal defines a set of subcarrier frequencies that are orthogonal to one another.

In yet another example, the multicarrier uplink signal can be split across multiple OFDMA subslots and, therefore, different subcarrier uplink signals of the multicarrier uplink signal can arrive at a transceiver in separate groups according to the subslots in which each group of subcarrier uplink signals were transmitted by the user device. In this implementation, the location management server can assume that the velocity of the user device is zero for the time period over which the multicarrier uplink signal was transmitted. Alternatively, the location management server can access motion data for the user device during the period over which the subcarrier uplink signals of the multicarrier uplink signal were transmitted and compensate for this motion during TDOA multilateration.

In another implementation in which the transceiver is a base station within a wireless network, the base station receives the multicarrier uplink signal from a user device that is being served by the base station, such that the wireless channel over which the multicarrier uplink signal is transmitted is characterized by a sufficient fidelity. More specifically, the base station is configured to receive the multicarrier uplink signal transmitted from the user device served by the base station in the wireless network.

Alternatively, the base station can receive multicarrier uplink signals from user devices served by other base stations in the wireless network. More specifically, the base station is configured to receive the multicarrier uplink signal transmitted from a user device served by a second base station in the wireless network. Thus, base stations in the wireless network can listen for multicarrier uplink signals and calculate TOAs for these multicarrier uplink signals despite a suboptimal wireless channel between the base station and the transmitting user device.

8.3 Accessing Device Calibration Functions

Generally, the transceiver can access a calibration function representing a relationship between subcarrier frequency and phase offset in Block S130. More specifically, the transceiver can access a transceiver specific calibration function that relates an input subcarrier frequency $f_n$ to an output phase offset $\theta_{d,m}$ for the transceiver m. Thus, the transceiver can account for deterministic frequency-dependent phase offsets caused by the specific analog hardware components, software, and/or firmware of the transceiver by first calibrating each transceiver (according to a calibration procedure further described below).

In one implementation in which the set of transceivers includes a set of base stations. Each transceiver and/or the location management server can access a calibration function associated with the individual transceiver in the set of transceivers based on a unique identifier of the transceiver. Alternatively, each transceiver and/or the location management server can access a calibration function associated with a make and model of each base station. Thus, in this alternative implementation, each calibration function is not particular to an individual base station or transceiver but is instead descriptive of each type or model of base station.

In another implementation in which the set of transceivers includes a set of user devices, each user device and/or the location management server can access a calibration function associated with the make and model of the user device. Alternatively, the user device and/or the location management server can access a calibration function associated with the international mobile equipment identity number of the user device.

8.4 Phase Difference Calculation

Generally, the transceiver can, for each subcarrier frequency in the set of subcarrier frequencies, calculate a phase difference between the subcarrier reference signal for the subcarrier frequency and a subcarrier uplink signal for the subcarrier frequency in Block S140. More specifically, upon receiving the multicarrier uplink signal transmitted by the user device, the transceiver can calculate a measured phase difference, $\theta_{meas,n,m}$, between each subcarrier uplink signal, n, of the multicarrier uplink signal and a corresponding subcarrier reference signal characterized by the same subcarrier frequency as the subcarrier uplink signal in Block S140. Thus, the transceiver can calculate a phase difference for each subcarrier frequency included in the multicarrier signal and in subsequent Blocks of the method S100 to refine these phase differences to eliminate or compensate for various phase offsets described above.

More specifically, the transceiver can: receive a set of digital samples representing the down-converted waveform of the multicarrier uplink signal; calculate a discrete Fourier transform (hereinafter "DFT") based on the set of digital samples; apply passband or other digital filters to the set of digital samples and/or other distortion reduction techniques; and calculate a set of phase differences between the multicarrier uplink signal and the multicarrier reference signal for each valid (i.e., characterized by sufficiently low distortion) subcarrier signal included in the multicarrier uplink signal. Alternatively, the transceiver can execute any of the aforementioned processes prior to transmitting a waveform representation of the received multicarrier uplink signal to the location management server for further processing according to Blocks of the method S200.

In one implementation, the transceiver can calculate a phase difference for a subset of subcarrier frequencies of the multicarrier uplink signal and multicarrier reference signal. More specifically, the transceiver can select a subset of subcarrier frequencies defined by the multicarrier uplink signal and the multicarrier reference signal that are not likely to exhibit a phase difference greater than $2\pi$ radians. In this implementation, the transceiver can: estimate the distance of the user device relative to the transceiver (e.g., based on a prior location estimate for the user device or based on a GNSS-based location estimate for the user device); estimate a phase shift of each subcarrier signal in the set of subcarrier signals of the multicarrier uplink signal during propagation over the estimated distance between the user device and the transceiver; and exclude those subcarrier signals that exhibit an estimated phase shift of greater than $2\pi$ radians over the estimated distance. Thus, the transceiver can exclude inaccurate phase measurements from its TOA estimation.

8.4.1 Cyclic Prefix Usage

Figure 6:
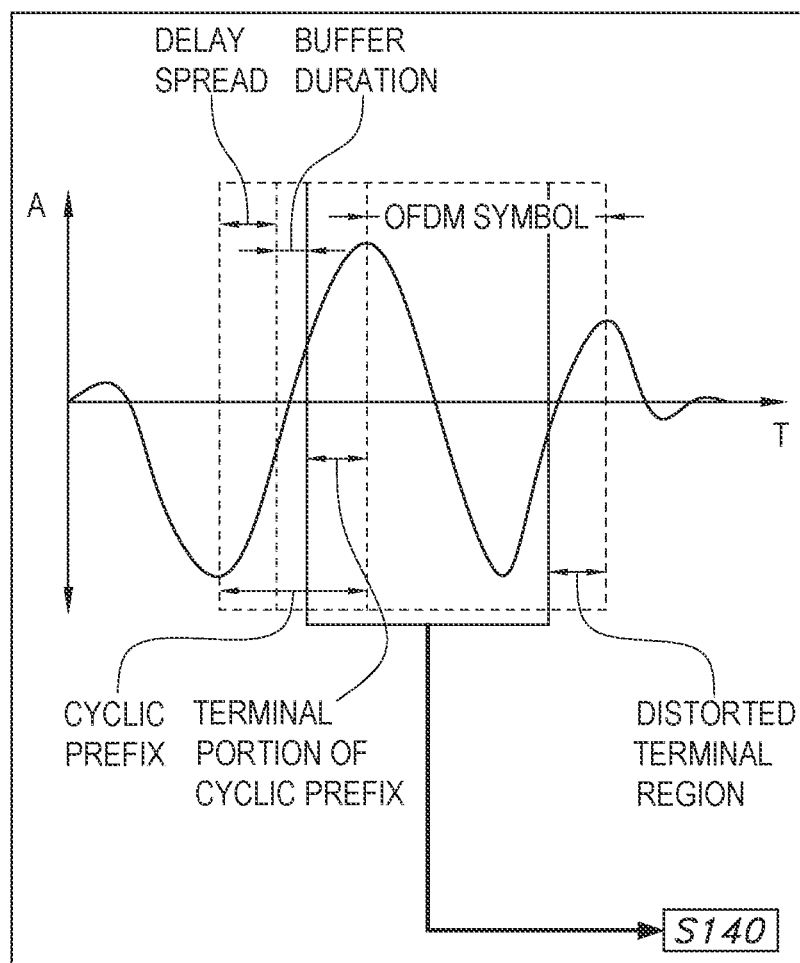
FIG. 6 is a flowchart representation of one variation of the first method.

In applications in which the communication protocol of the network is an OFDM communication scheme, the transceiver can utilize a terminal portion of the cyclic prefix of each symbol in the multicarrier uplink signal in order to further increase the accuracy of the phase difference calculation referenced in Block S140 described above. As shown in FIG. 6, in this implementation, the transceiver is configured to calculate the phase difference between the subcarrier reference signal for the subcarrier frequency and the subcarrier uplink signal for the subcarrier frequency, based on, for each symbol of the subcarrier uplink signal, a sampling window comprising a terminal portion of a cyclic prefix of the symbol and excluding a terminal region of the symbol. In particular, the transceiver can be configured to: calculate a duration of the terminal portion of the cyclic prefix based on a delay spread of the received subcarrier frequency; and calculate a duration of the terminal region of the symbol based on a roll-off factor of the user device.

Generally, multicarrier OFDM communication protocols incur waveform distortion toward the terminal region of each symbol (due to the roll-off factor of the raised cosine DAC reconstruction filter). Although this terminal distortion does not meaningfully affect interpretation of each symbol of the multicarrier signal by the receiver, this terminal distortion introduces a non-linear, frequency-dependent error to the phase difference calculation of each subcarrier signal of the multicarrier signal during execution of Block S140. However, the transceiver can instead sample a terminal portion of the cyclic prefix that is characterized by less distortion than the aforementioned terminal region of the symbol. Thus, the transceiver can shift forward and expand the per-symbol sampling window to include a terminal portion of the cyclic prefix for each subcarrier signal of the multicarrier signal to avoid distortion in the terminal region of the symbols of the subcarrier signal.

Additionally, the transceiver avoids distortion within the cyclic prefix caused by multipath fading of the previous symbol by characterizing the current delay spread of the channel and excluding an initial portion of the cyclic prefix of a length equal to the delay spread plus a buffer duration (based on the expectant propagation delay of the signal and the expected clock bias between the user device and the transceiver). This terminal portion of the cyclic prefix that is unaffected by multipath fading exists because the duration of the cyclic prefix for the communication protocol is set based on the worst-case delay spread estimated for the subcarrier signal. Therefore, in most cases, a significant portion of the cyclic prefix can be utilized to calculate the phase difference between a subcarrier uplink signal and the subcarrier reference signal. For example, if the cyclic prefix for the communication protocol is four microseconds and the delay spread is equal to one microsecond, the transceiver can utilize a terminal portion of the cyclic prefix up to three microseconds in duration (minus the buffer accounting for propagation delay and clock bias). Thus, the transceiver can calculate the phase difference of a subcarrier uplink signal relative to a subcarrier reference signal based on a sampling window that includes a terminal portion of the cyclic prefix and excludes a terminal region of each data symbol in the subcarrier signal.

More specifically, for each subcarrier uplink signal in the set of subcarrier signals, the transceiver can: execute instantaneous channel estimation, statistical channel estimation, and/or super-resolution methods (e.g., a multiple signal classification algorithm) to calculate a current delay spread of the subcarrier signal; calculate a usable duration of a terminal portion of a cyclic prefix of the subcarrier signal based on the current delay spread; and calculate a phase difference $\theta_{meas,n,m}$, between the subcarrier uplink signal, n, and a corresponding subcarrier reference signal characterized by the same subcarrier frequency based on a sampling window including the terminal portion of each cyclic prefix of the subcarrier signal and excluding the terminal region of each data symbol of the subcarrier uplink signal.

In one implementation, the transceiver can estimate the delay spread of the subcarrier signal based on a pilot sequence. Alternatively, the transceiver can utilize the content of the cyclic prefix to estimate the delay spread of the channel. In these implementations, the transceiver can execute a channel-estimation-based algorithm to generate a power-delay profile based on a known reference signal and the received signal. Given the power-delay profile for the channel, the transceiver can calculate the delay spread (i.e., the root mean square delay spread) of the channel.

Upon calculating the delay spread for each subcarrier signal in the set of subcarrier signals, the transceiver can subtract the delay spread value (plus a buffer duration) from the cyclic prefix in order to calculate the usable duration of a terminal portion of the cyclic prefix. For example, for a channel characterized by a cyclic prefix with a duration of four microseconds, a calculated delay spread of 2.5 microseconds and a buffer duration of 0.5 microseconds, the transceiver can calculate a usable duration of the terminal portion of the cyclic prefix of one microsecond.

In an alternative implementation, the transceiver can execute a super-resolution algorithm such as multiple signal classification (hereinafter "MUSIC") to generate a multipath profile for the channel and the power of each identified multipath component in the multipath profile (as described in further detail in U.S. Provisional Application No. 63/105, 822). Upon executing the MUSIC algorithm, the transceiver can calculate the delay spread as the delay between the line-of-sight component and the latest significant multipath component identified by the MUSIC power spectrum.

In addition to identifying a terminal portion of the cyclic prefix for utilization in the phase difference calculation, the transceiver can also exclude a terminal region of each symbol of the subcarrier signal that is affected by waveform distortion due to the DAC reconstruction filter. The transceiver can calculate an excluded duration of this terminal region of each symbol based on the roll-off factor, $\beta$, of the reconstruction filter utilized by the transmitter (i.e., the user device for uplink signals and a wireless node or base station for downlink signals). In one example, the transceiver can exclude a terminal region of the symbol characterized by an excluded duration $t=2T/\beta$, where T is the sampling rate of the DAC at the transmitter. Thus, the transceiver can identify a region of the symbol and cyclic prefix of the multicarrier signal including the terminal portion of the cyclic prefix characterized by a usable duration and excluding the terminal region of the symbol characterized by an excluded duration (as shown in FIG. 6).

In this implementation, the transceiver can set a buffer duration for calculating the usable portion of the cyclic prefix based on an estimation of the sum of the DAC delay and a rough estimate of the propagation delay between transmitter and receiver of the signal (e.g., based on the estimated line-of-sight distance between transmitter and receiver in the network). In one example, the buffer duration also accounts for an estimated time bias between transmitter and receiver.

In this implementation, the transceiver can periodically recalculate the delay spread of the channel and, therefore, recalculate the usable duration of the terminal portion of the cyclic prefix. Thus, the transceiver can modify the sampling window of each subcarrier signal in the set of subcarrier signals utilized for phase difference calculation over time as the delay spread of the channel changes.

Furthermore, in this implementation, the transceiver can access the terminal portion of the multicarrier waveform that may otherwise be discarded at the physical layer prior to the guard interval removal step of the communication protocol. Therefore, the transceiver can retrieve digital samples from the cyclic prefix of the multicarrier signal.

8.5 Frequency-Dependent Phase Adjustment

Generally, the transceiver can adjust the phase difference calculated for each subcarrier uplink signal by a frequency-dependent phase offset, $\theta_{d,m}(f_n)$, based on the corresponding subcarrier frequency and the calibration function of the transceiver to generate an adjusted phase difference in a set of adjusted phase differences in Block S150. More specifically, the transceiver can: identify the subcarrier frequency associated with the subcarrier uplink signal; calculate a corresponding frequency-dependent phase offset based on the subcarrier frequency according to the calibration function; and subtract this frequency-dependent phase offset from $\theta_{meas,n,m}$. Thus, the transceiver can eliminate the effects of the hardware, software, and/or firmware of the transceiver on $\theta_{meas,n,m}$ and further isolate $\theta_{\tau,n,m}$ for each subcarrier uplink signal, n, as follows:

$\theta_{meas,n,m} - \theta_{d,m}(f_n) = \theta_{\tau,n}(f_n,\tau_m) + \theta_{fc}(f_c,\tau_m) + \theta_c + \theta_{u,m}(f_n) + \theta_{D,n} = \theta_{adj,n,m}$ In one implementation, the transceiver can access a linear calibration function of the transceiver, in which case the frequency-dependent phase offset manifests as frequency-dependent delay, $\tau_{d,m}(f_n)$. However, the transceiver can access a calibration function describing any mathematical relationship between the frequency-dependent phase offset and subcarrier frequency.

8.6 Time-of-Arrival Estimation

Figure 5:
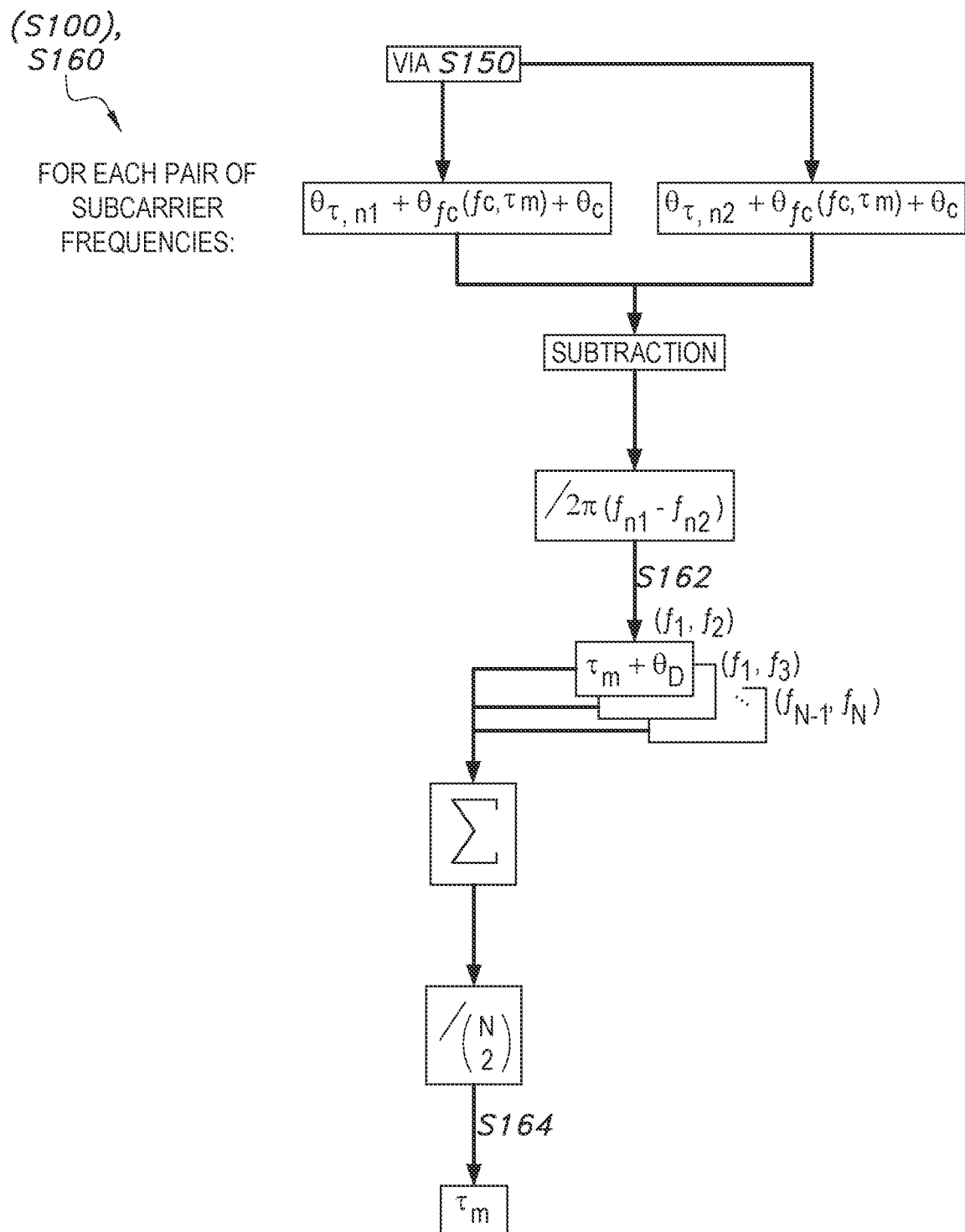
FIG. 5 is a flowchart representation of one variation of the first method.

Generally, the transceiver can estimate a TOA of the multicarrier uplink signal at the transceiver based on the set of adjusted phase differences for each subcarrier reference signal in the set of subcarrier reference signals in Blocks S160. As shown in FIG. 5, the transceiver can, for each pair of subcarrier frequencies in the set of subcarrier frequencies, calculating a TOA estimate in a set of TOA estimates based on: a first phase difference for a first subcarrier frequency in the pair of subcarrier frequencies; and a second phase difference for a second subcarrier frequency in the pair of subcarrier frequencies in Block S162. In particular, the transceiver can: calculate the TOA estimate in the set of TOA estimates for each pair of subcarrier frequencies in the set of subcarrier frequencies by solving for $\tau_m$ in:

$$\tau_{m,n_1,n_2} = -\frac{\theta_{adj,n_1,m} - \theta_{adj,n_2,m}}{2\pi(f_{n_1} - f_{n_2})},$$

wherein $\tau_m$ represents the TOA estimate, $\theta_{adj,n_1,m}$ represents the first phase difference for the first subcarrier frequency, $\theta_{adj,n_2,m}$ represents the second phase difference for the second subcarrier frequency, $f_{n_1}$ represents the first subcarrier frequency, and $f_{n_2}$ represents the second subcarrier frequency.

Thus, instead of calculating the TOA, $\tau_m$, for the received multicarrier at transceiver, m, via a single phase measurement (e.g., via the equation $\tau_m = \theta_{\tau,n,m}/2\pi f_n$), the transceiver can instead calculate, a TOA estimate, $\tau_{m,n,n_1,n_2}$, based on any two adjusted phase differences from any two subcarrier uplink signals, n 1 and n 2, corresponding to subcarrier frequencies $f_{n_1}$ and $f_{n_2}$ in the set of subcarrier uplink signals, N, as follows:

$$\tau_{m,n_1,n_2} = -\frac{\theta_{adj,n_1,m} - \theta_{adj,n_2,m}}{2\pi(f_{n_1} - f_{n_2})}.$$

Thus, by calculating $\tau_{m,n,n_1,n_2}$ based on two phase differences extracted from two subcarrier uplink signals, the transceiver can cancel out the phase offsets affecting both subcarrier uplink signals, as shown in the expansion below (assuming $\theta_D = 0$):

$$-\frac{\theta_{adj,n_1,m} - \theta_{adj,n_2,m}}{2\pi(f_{n_1} - f_{n_2})} = -\frac{\begin{array}{c}\theta_{\tau,n_1}(f_{n_1}, \tau_m) + \theta_{fc}(f_c, \tau_m) + \theta_c + \theta_{u,m}(f_{n_1}) - \\ \theta_{\tau,n_2}(f_{n_2}, \tau_m) - \theta_{fc}(f_c, \tau_m) - \theta_c - \theta_{u,m}(f_{n_2})\end{array}}{2\pi(f_{n_1} - f_{n_2})} =$$

$$-\frac{\theta_{\tau,n_1}(f_{n_1}, \tau_m) + \theta_{u,m}(f_{n_1}) - \theta_{\tau,n_2}(f_{n_2}, \tau_m) - \theta_{u,m}(f_{n_2})}{2\pi(f_{n_1} - f_{n_2})} =$$

$$-\frac{\theta_{\tau,n_1}(f_{n_1}, \tau_m) - \theta_{\tau,2}(f_{n_2}, \tau_m)}{2\pi(f_{n_1} - f_{n_2})} - \frac{\theta_{u,m}(f_{n_1}) - \theta_{u,m}(f_{n_2})}{2\pi(f_{n_1} - f_{n_2})} =$$

$$\tau_m - \frac{\theta_{u,m}(f_{n_1}) - \theta_{u,m}(f_{n_2})}{2\pi(f_{n_1} - f_{n_2})}.$$

As a result of adding the combined phase distortion for the subcarrier frequency pair, $\theta_{D,n_1,n_2}$, back into the equation:

$$\tau_{m,n_1,n_2} = -\frac{\theta_{adj,n_1,m} - \theta_{adj,n_2,m}}{2\pi(f_{n_1} - f_{n_2})} = \tau_m - \frac{\theta_{u,m}(f_{n_1}) - \theta_{u,m}(f_{n_2}) + \theta_{D,n_1,n_2}}{2\pi(f_{n_1} - f_{n_2})}.$$

Therefore, upon execution of Block S160 and elimination of the $\theta_{fc}(f_c,\tau_m)$ and $\theta_c$ terms, the transceiver can further isolate $\tau_m$ via execution of subsequent Blocks of the method S100.

Additionally, by executing the above calculation for each unique pair of subcarrier frequencies in the set of subcarrier frequencies, the transceiver can generate a set of TOA estimates, $\tau_{m,n,n_1,n_2}$, each affected by phase distortion $\theta_D$ such that the transceiver or the location management server can aggregate this set of TOA estimates in order to reduce the noise in the overall TOA calculation, as is further described below.

In one implementation, the transceiver can calculate a maximum frequency difference, $f_{n_1}-f_{n_2}$ between subcarrier frequencies pairs with which the transceiver calculates the set of TOA estimates. In this implementation, the transceiver accesses an approximate distance from the user device from the transceiver (e.g., based on a prior location estimate for the user device) and calculates a threshold frequency difference such that a $2\pi$ wraparound in the phase difference does not occur over that distance during propagation of the multicarrier uplink signal from the user device to the transceiver.

8.7 Phase Distortion Mitigation of TOA Estimates

Generally, the transceiver can: calculate the TOA of the multicarrier uplink signal at the transceiver based on the set of TOA estimates in order to reduce the effects of phase distortion in the TOA calculation in Block S164. More specifically, the transceiver can mitigate phase distortion in the TOA calculation prior to transmitting the TOA calculation to the location management server by averaging TOA estimates calculated based on various unique pairs of subcarrier frequencies in the set of subcarrier frequencies of the multicarrier uplink signal, such as according to the following equation:

$$\tau_m + \tau_{u,m} \cong \frac{1}{(N-1)}\sum_{n=1}^{N-1}\tau_{m,n,n+1}$$

$$\tau_m + \tau_{u,m} \cong -\frac{1}{2\pi(N-1)}\sum_{n=1}^{N-1}\frac{\theta_{adj,n,m} - \theta_{adj,n+1,m}}{(f_n - f_{n+1})}$$

$$\tau_m + \tau_{u,m} \cong \tau_m - \frac{1}{2\pi(N-1)}\sum_{n=1}^{N-1}\frac{\theta_u(f_n) - \theta_u(f_{n+1}) + \theta_{D,n,n+1}}{(f_n - f_{n+1})}$$

$$\tau_m + \tau_{u,m} \cong \tau_m - \frac{1}{2\pi(N-1)}\sum_{n=1}^{N-1}\frac{\theta_u(f_n) - \theta_u(f_{n+1}) + \theta_{D,n,n+1}}{(f_n - f_{n+1})},$$

where $\tau_{u,m}$ represents the sampling time offset of the transceiver, m, and the user device and where $\Sigma_{n=1}^{N-1}\theta_{D,n,n+1}\cong0$. Alternatively, the transceiver can average any set of N−1 or fewer TOA estimates, $P=\{\tau_{m,n_1,n_2}, \ldots, \tau_{m,n_i,n_j}\}$, where $n_i$, $n_j \in N$ (e.g., TOA estimates calculated from a set of non-consecutive subcarrier frequency pairs):

$$\tau_m + \tau_{u,m} \cong \frac{1}{|P|}\sum P.$$

Thus, the transceiver can calculate an average of the set of TOA estimates in order to calculate a single distortion-mitigated TOA value for the multicarrier uplink signal at the transceiver, that is still offset by the sampling time offset, $\tau_{u,m}$. However, the sampling time offset, $\tau_{u,m}$ is cancelled out in Block S220 executed by the location management server, as is further described below.

Additionally, the transceiver can also average a subset of TOA estimates from the set of all possible TOA estimates calculated by the transceiver in Block S160. For example, the transceiver can discard TOA estimates likely to have been affected by a $2\pi$ wraparound of the phase difference with which the transceiver calculates the TOA estimate.

In one implementation, the transceiver can calculate a weighted average of the TOA estimates in order to calculate the TOA of the multicarrier uplink signal. More specifically, the transceiver can calculate a weighted average of the set of TOA estimates based on, for each TOA estimate in the set of TOA estimates: a first phase distortion associated with the first subcarrier frequency for the TOA estimate; and a second phase distortion associated with the second subcarrier frequency for the TOA estimate. In particular, the transceiver can execute phase distortion measurement for each subcarrier frequency defined by the multicarrier uplink signal and subsequently increase the weight of TOA estimates derived from low-distortion subcarrier uplink signals in the average. For example, the transceiver can calculate a weighted average according to the following equation:

$$\tau_m + \tau_{u,m} \cong -\frac{1}{2\pi(N-1)}\sum_{n=1}^{N-1}w_n w_{n+1}\frac{\theta_{adj,n,m} - \theta_{adj,n+1,m}}{(f_n - f_{n-1})}$$

wherein $w_n$ represents a weight corresponding to the subcarrier frequency, $f_n$. However, the transceiver can calculate a weighted average of TOA estimates according to any weighting scheme and based on any measurement characterizing the subcarrier frequency of the multicarrier uplink signal. Alternatively, the system can calculate a weighted average for the set of P non-consecutive TOA estimates.

Upon calculation of the TOA for the multicarrier uplink signal and transmission of the TOA to the location management server, the location management server can then calculate a single TDOA between each pair of transceivers, $\tau_{m_1}-\tau_{m_2}$, in the set of transceivers, M, according to Blocks of the method S200 as is further described below. Therefore, by calculating an averaged TOA, $\tau_m$, prior to transmission to the location management server, the transceiver reduces the quantity of data that is transmitted over the network (e.g., in a 5G protocol, via NRPPa), as the transceiver can transmit the single value, $\tau_m$, over the network as opposed to a TOA estimate for each combination of subcarrier uplink signals in the set of subcarrier uplink signals.

Alternatively, the transceiver can transmit the full set of TOA estimates to the location management server and the location management server can execute the above-described phase distortion mitigation, thereby reducing the processing burden of the transceiver. More specifically, the transceiver can be configured to transmit the set of time-of-arrival estimates to the remote server.

8.8 Deterministic Frequency-Dependent Phase Offset Calibration

In one implementation, prior to execution of the above-mentioned Blocks of the method S100, transceiver (or another entity in the network) can execute a set of calibration to calculate the deterministic frequency-dependent phase offset, $\theta_{d,m}$ of the transceiver, m. More specifically, the transceiver can calibrate by: executing the method S100 as described above with a known user device location (selected to avoid multipath or other environmental scenarios detrimental to location accuracy); and attributing location inaccuracies to $\theta_{d,m}(f_n)$ of the transceiver. The transceiver can then calculate a best fit function characterizing the deterministic frequency-dependent phase offset's dependence on subcarrier frequency.

In one example, the transceiver can execute the method S100 with a calibration device acting as a user device that is located at a known location with a line-of-sight to two or more transceivers. Upon calculating $\theta_{\tau,n_1}(f_{n_1}, \tau_m)$ the transceiver can compare this to a precalculated ideal $\theta_{\tau,n_1}(f_{n_1}, \tau_m)$ between the calibration device and the transceiver m given a known distance between these devices. This difference between the known $\theta_{\tau,n_1}(f_{n_1}, \tau_m)$, and the $\theta_{\tau,n_1}(f_{n_1}, \tau_m)$ calculated during the calibration procedure can then be set equal to a $\theta_{d,m}(f_n)$ for the frequency $f_{n_1}$. This process can then be repeated across multiple frequencies $f_n$ to map the dependence of $\theta_{d,m}$ on the subcarrier frequency, $f_n$.

In another example, the transceiver can select calibration points by: rasterizing a target area into three-dimensional pixels; executing a signal propagation simulation to detect a subset of these three-dimensional pixels representing a location where the signal is line-of-sight and is characterized by greater than a threshold signal-to-noise ratio at two or more transceivers; generating a raster mask of populated or open locations in the target area; and detecting the overlap between the raster mask and the detected subset of these three-dimensional pixels at which the transceiver can execute the calibration process.

8.9 TOA Transmission and Access

Figure 7A:
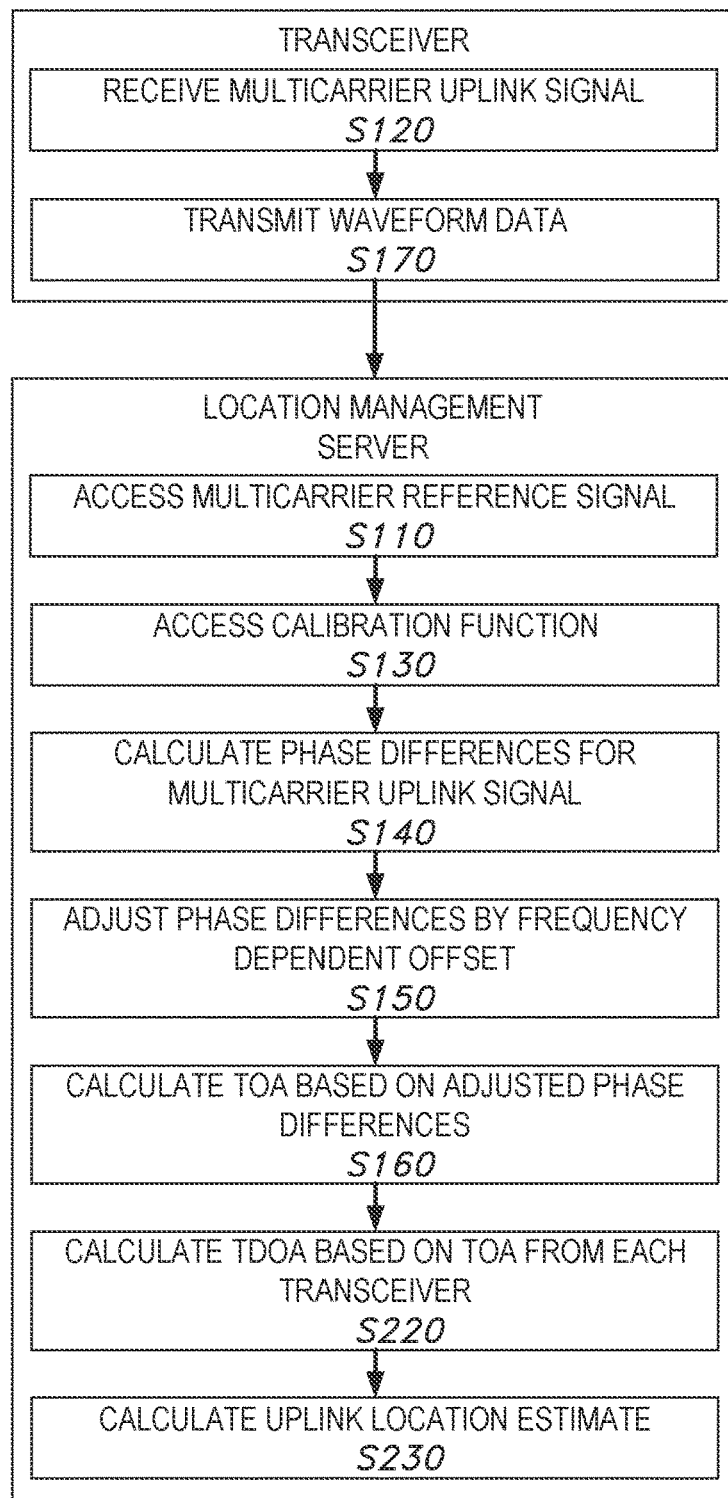
FIG. 7A is a flowchart representation of one variation of the first method and the second method.
Figure 7B:
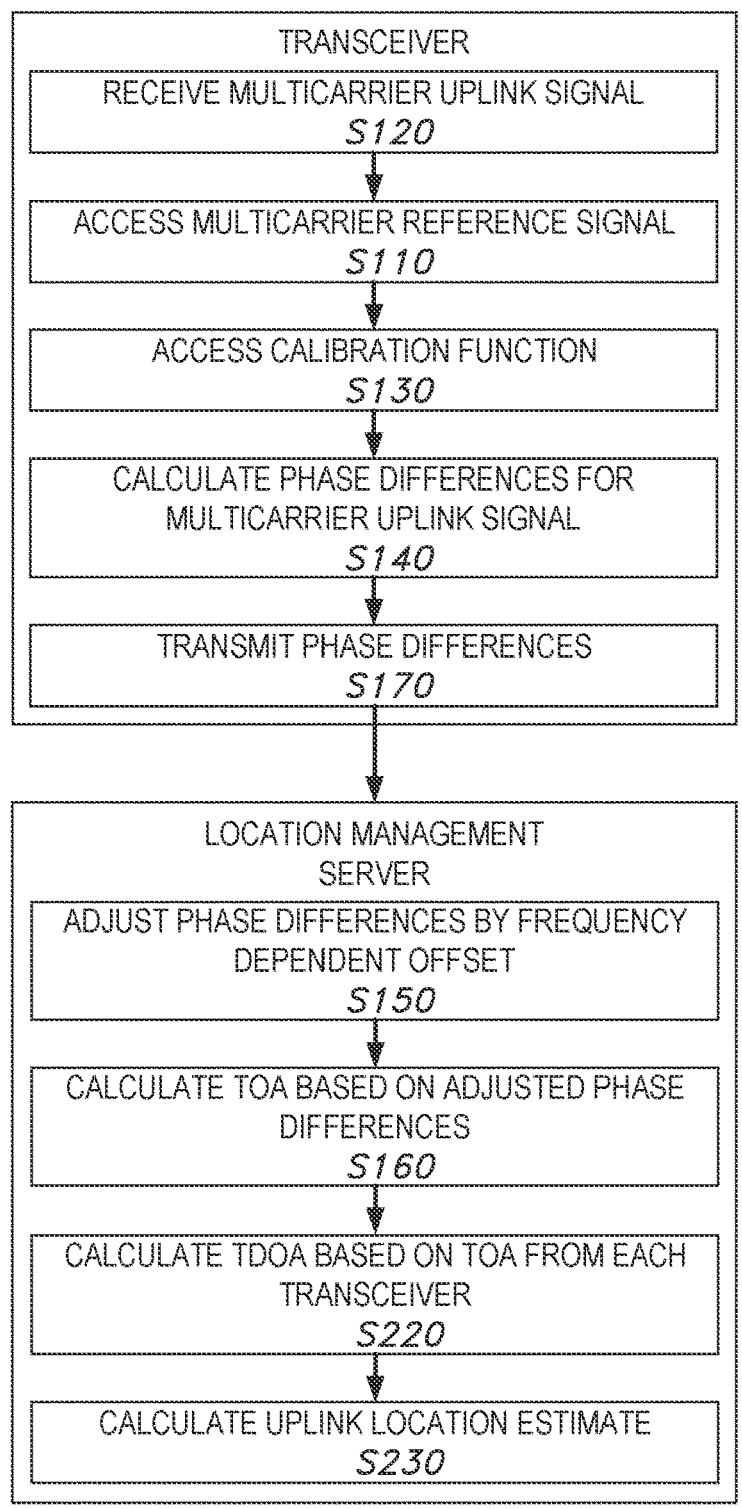
FIG. 7B is a flowchart representation of one variation of the first method and the second method.
Figure 7C:
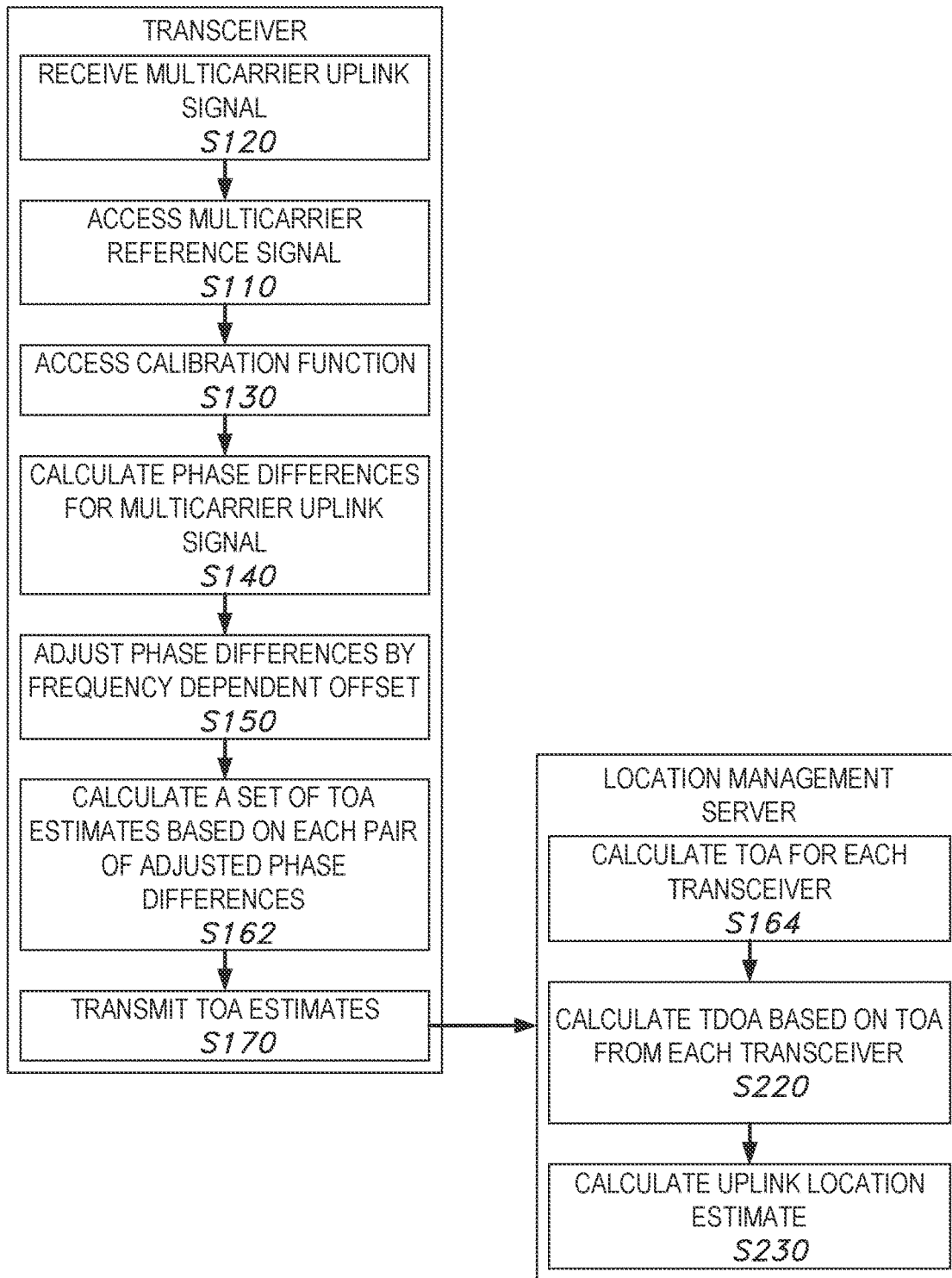
FIG. 7C is a flowchart representation of one variation of the first method and the second method.
Figure 7D:
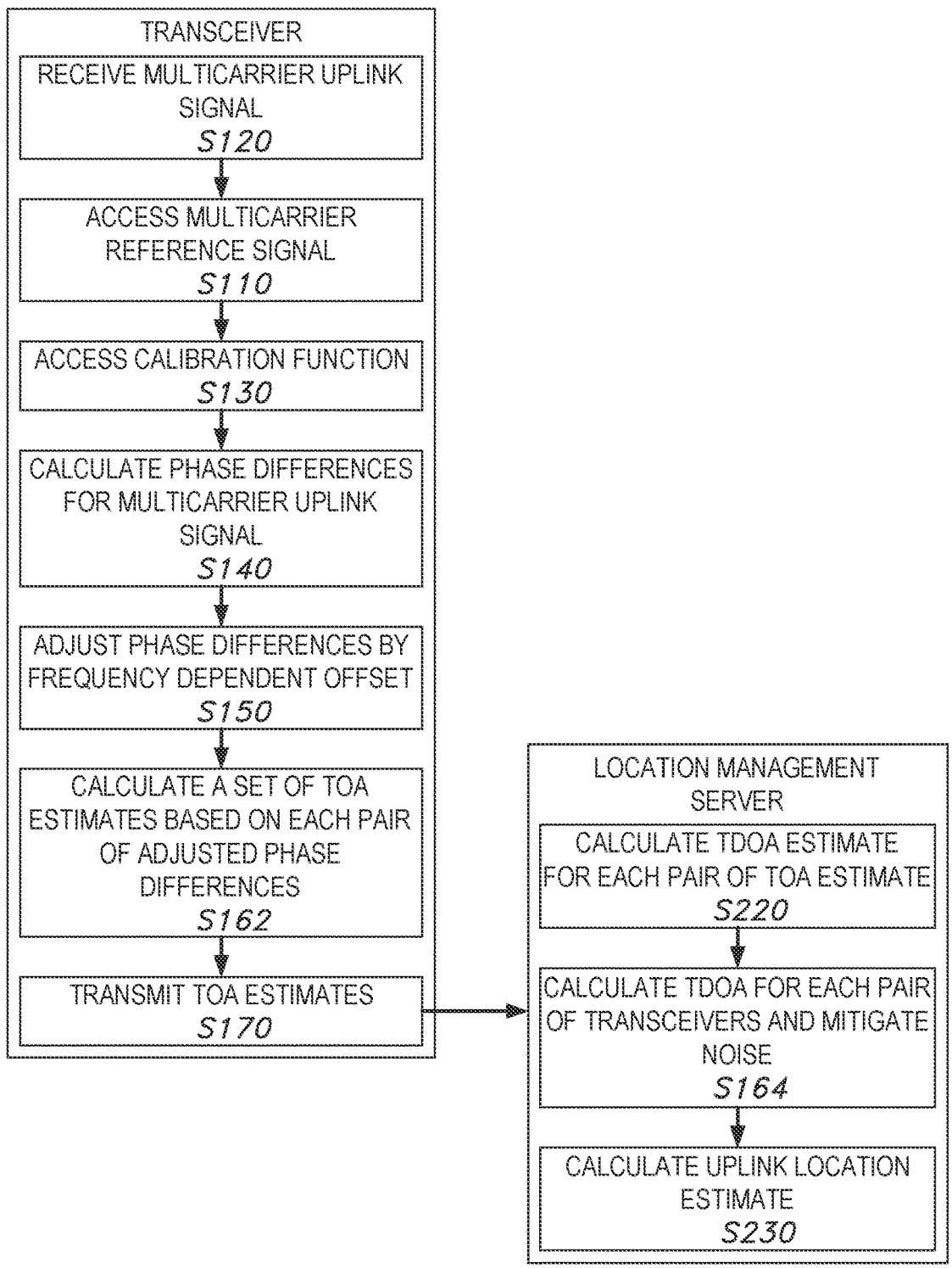
FIG. 7D is a flowchart representation of one variation of the first method and the second method.
Figure 7E:
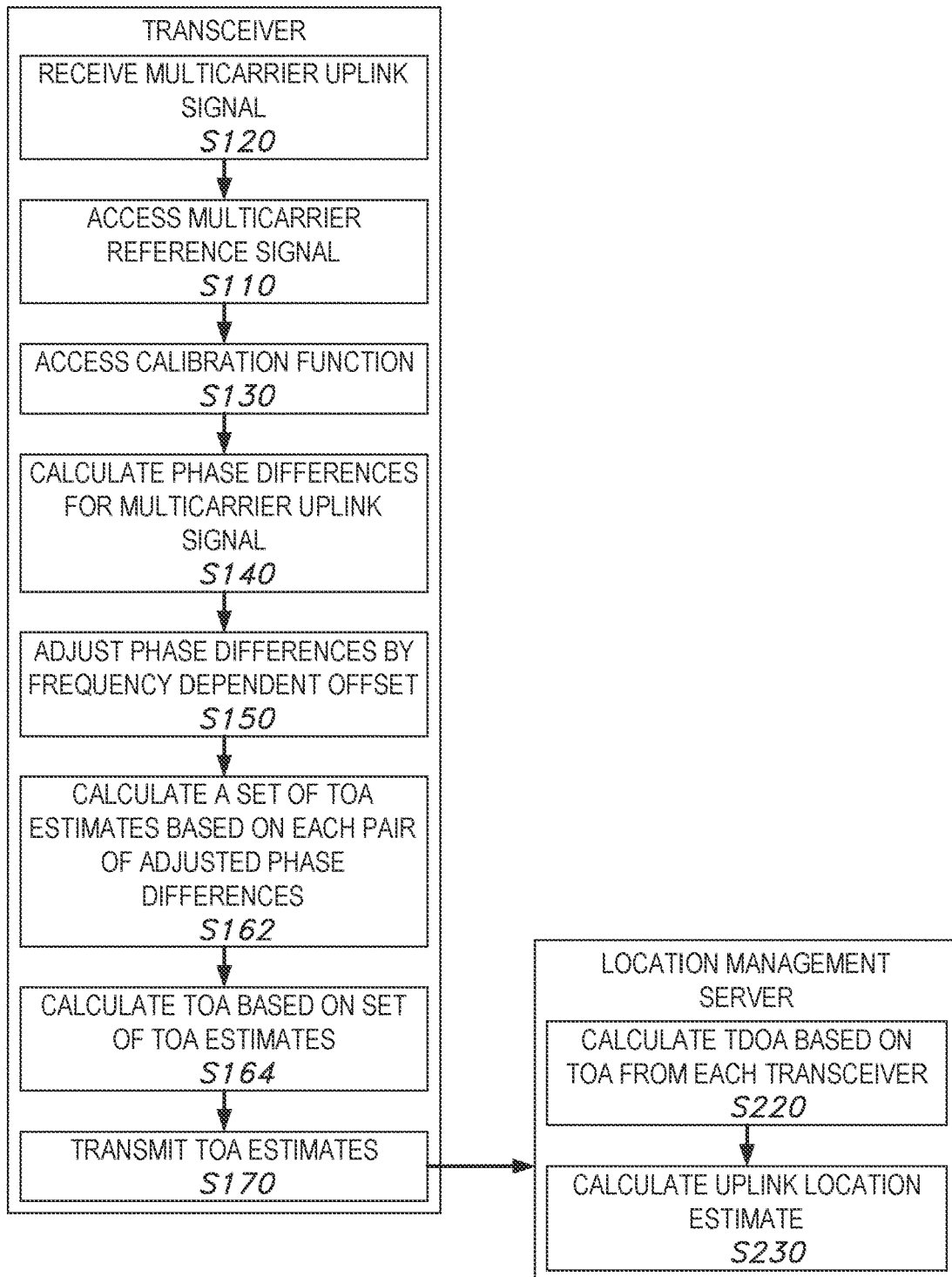
FIG. 7E is a flowchart representation of one variation of the first method and the second method.

As shown in FIG. 7E, upon calculation of a TOA of the multicarrier uplink signal ($\tau_m + \tau_{u,m}$), the transceiver can transmit (e.g., in a 5G protocol, via NRPPa) the TOA of the multicarrier uplink signal at the transceiver to a remote server such as the location management server in Block S110. Alternatively, the transceiver can transmit the TOA of the multicarrier uplink signal at the transceiver to another server in the network from which the location management server can successively access the TOA of the multicarrier uplink signal. Thus, after each transceiver in the set of transceivers that received the multicarrier uplink signal transmit the TOA of the multicarrier uplink signal to the location management server, the location management server can execute Blocks of the method S200 to localize the user device based on the set of TOAs.

Correspondingly, the location management server can, for each transceiver in a set of transceivers, access a TOA, at the transceiver, of a multicarrier uplink signal transmitted from the user device in Block S210. In one implementation, the location management server can receive (e.g., via NRPPa) the TOA of the multicarrier uplink signal directly from each transceiver in the set of transceivers.

Alternatively, as shown in FIGS. 7C and 7D, instead of accessing a single TOA of the multicarrier uplink signal for each transceiver in the set of transceivers, the location management server can instead access or receive a set of TOA estimates for each transceiver in the set of transceivers and can then execute Block S164 in order to mitigate phase distortion in the calculation of the TOA of the multicarrier uplink signal at each transceiver. More specifically, the location management server can be configured to, for each transceiver in the set of transceivers, access a set of TOA estimates, each TOA estimate based on a pair of subcarrier frequencies in the set of subcarrier frequencies; and for each transceiver in the set of transceivers, calculate the TOA, at the transceiver, of the multicarrier uplink signal, based on the set of TOA estimates.

In one implementation, as shown in FIG. 7B, the location management server can: for each transceiver in the set of transceivers, access a phase difference for each subcarrier frequency in the set of subcarrier frequencies of the multicarrier uplink signal. In this implementation, the location management server can execute Blocks S162 and S164 of the method S100 in addition to Blocks of the method S100, thereby further reducing computation overhead at each transceiver in the set of transceivers while increasing the computational overhead for the location management server.

In another implementation in which the location management server accesses a set of TOA estimate for each transceiver in the set of transceivers, the location management server can, for each transceiver in the set of transceivers, calculate a weighted average of the set of time-of-arrival estimates based on a signal-to-noise ratio of the multicarrier uplink signal as measured by the transceiver, as shown in FIG. 7C. In this implementation, the location management server executes the weighted average equation described above. However, in this implementation, $w_{n_1}$ represents a weight based on the signal-to-noise ratio of the first subcarrier uplink signal for subcarrier frequency, $f_{n_1}$, and $w_{n_2}$ represents a weight based on the signal-to-noise ratio of the second subcarrier uplink signal for subcarrier frequency $f_{n_2}$.

In yet another implementation, shown in FIG. 7A, the transceiver can transmit raw waveform data describing the multicarrier uplink signal to the location management server and the location management server can execute all further Blocks of both method S100 and method S200.

8.10 Time-Difference-of-Arrival Calculation

Generally, the location management server can calculate a set of TDOAs based on the TOA of the multicarrier uplink signal at each transceiver in the set of transceivers in Block S220. For example, for a group of three transceivers, the location management server can calculate two TDOAs (or three for redundancy) in order to fully define the relative TOA differences in the set of transceivers. By calculating a TDOA, the location management server can eliminate constant and/or frequency-dependent time offsets affecting each TOA equally, which may result from phase offsets due to sampling time offsets between the transceiver and the user device and/or phase offsets due to the analog hardware components, software, and/or firmware of the user device. More specifically, the location management server can calculate a TDOA of two TOAs to eliminate the sampling-time-offset, $\tau_{u,m}$, assuming sufficient time synchronization across the set of transceivers ($\tau_{u,m_1} - \tau_{u,m_2} \ll \tau_{m_1} - \tau_{m_2}$), M, as shown below:

$$T_{m_1} + \tau_{u,m_1} - (\tau_{m_2} + \tau_{u,m_2}) \cong \tau_{m_1} - \tau_{m_2}$$

wherein $m_1$ and $m_2$ are individual transceivers in the set of M transceivers. Thus, the location management server can eliminate the effects of $\tau_{u,m}$ by utilizing TDOA localization instead of TOA localization, thereby eliminating additional frequency-dependent phase offsets from the TDOA calculation and eliminating the effects of poor time synchronization between the user device and the set of transceivers.

In one implementation, the location management server calculates a set of TDOAs for each pair of transceivers in the set of transceivers corresponding to each unique pair of subcarrier frequencies in the set of subcarrier frequencies. Thus, by calculating the TDOA based on a pair of TOAs calculated based on the same pair of subcarrier frequencies, the location management server can more effectively remove the contribution of $\tau_{u,m}$. However, in this implementation, the location management server executes phase mitigation based on the set of TDOAs similar to the phase distortion mitigation described above with respect to TOAs.

8.10.1 Phase Distortion Mitigation of TDOAs

In one implementation, shown in FIG. 7C, in which the set of transceivers each transmit a set of TOA estimates to the location management server in Block S110, the location management server can correct the TDOA for a pair of transceivers for phase distortion, $\theta_{D,m_1,m_2} = \theta_{D,n,n+1,m_1} - \theta_{D,n,n+1,m_2}$, in Block S222. More specifically, the location management server can: execute multiple iterations of Blocks S150, S160, and S220 based on different combinations of subcarrier uplink signals in the set of subcarrier uplink signals; and execute statistical noise reduction techniques to reduce the influence of phase distortion. For example, in OFDM 5G transmission, the multicarrier uplink signal can include upwards of 1200 subcarrier uplink signals. Thus, the location management server can further improve the accuracy of the TDOA by repeatedly calculating TDOAs between the pair of transceivers based on unique pairs of subcarrier frequencies of the multicarrier uplink signal.

In one implementation, the location management server can average the set of TDOA estimates to eliminate phase distortion as follows:

$$\tau_{m_1} - \tau_{m_2} \cong -\frac{1}{2\pi(N-1)}$$

$$\sum_{n=1}^{N-1} \frac{(\theta_{adj,n,m_1} - \theta_{adj,n+1,m_1}) - (\theta_{adj,n,m_2} - \theta_{adj,n+1,m_2})}{(f_n - f_{n+1})} \cong \tau_{m_1} - \tau_{m_2} -$$

$$\frac{1}{2\pi(N-1)}\sum_{n=1}^{N-1}\frac{\theta_{u,m_1}(f_n) - \theta_{u,m_1}(f_{n+1}) - (\theta_{u,m_2}(f_n) - \theta_{u,m_2}(f_{n+1})) + \theta_{D,m_1,m_2}}{(f_n - f_{n+1})} \cong$$

$$\tau_{m_1} - \tau_{m_2} - \frac{1}{2\pi(N-1)}\sum_{n=1}^{N-1}\frac{\theta_{D,m_1,m_2}}{(f_n - f_{n+1})},$$

where $\theta_{u,m_1}(f_n) \cong \theta_{u,m_2}(f_n)$ for all $m_1$ and $m_2$ in M and for all n in N and where $\sum_{n=1}^{N-1}\theta_{D,m_1,m_2} \cong 0$.

Alternatively, the location management server can execute the above averaging equation for some subset of N−1 subcarrier frequency pairs. In another alternative implementation, the location management server can calculate a weighted average of TDOAs based on phase-noise-related factors such as the signal-to-noise ratio of each multicarrier uplink signal.

However, the location management server can execute any other statistical analyses and/or corrections of phase distortion in order to reduce phase distortion affecting each calculated TDOA.

8.11 Time-Difference-of-Arrival Multilateration

Generally, upon correcting each TDOA in the set of TDOAs for phase distortion as described above, the location management server calculates an uplink location estimate of the user device via multilateration based on the set of TDOAs and a known location of each transceiver in the set of transceivers in Block S230. More specifically, given a known location for each transceiver and TDOAs representing the relative arrival time of the multicarrier uplink signal at each transceiver in the set of M transceivers, the location management server can execute TDOA multilateration algorithms to calculate a location of the user device. For example, given two TDOAs between three transceivers, the location management server can calculate a location of the user device in two dimensions. In another example, given three TDOAs between four transceivers, the location management server can calculate a location of the user device in three dimensions. Additionally or alternatively, for an over-determined system of greater than three TDOAs between greater than four transceivers, the location management server can execute the least squares method to statistically calculate a location of the user device in three dimensions.

9. Downlink Protocol

As shown in FIG. 3, the network is configured to execute a downlink localization protocol in which the user device executes analogous steps to Blocks of the methods S100 and S200, including Blocks of the method S300 further described below, in order to localize itself relative to the set of transceivers (or globally given known locations of the set of transceivers). More specifically, the set of transceivers can each transmit a multicarrier downlink that is received by the user device. The user device can then calculate subcarrier phase differences for each multicarrier downlink signal relative to the multicarrier reference signal.

Therefore, in this variation, the user device can localize itself independent of the location management server and can subsequently report its downlink location estimate to the location management server. Alternatively, the user device can transfer waveform data, subcarrier phase data, TDOA estimates (e.g., relative to a master TOA, such as the TOA associated with the multicarrier downlink signal transmitted by the serving base station), or any other form of intermediate data to the location management server, which can then complete computation of the downlink location estimate for the user device.

In an analogous step to Block S110 of the method S100, the user device can access a multicarrier reference signal defining the set of subcarrier frequencies and including a subcarrier reference signal for each subcarrier frequency in the set of subcarrier frequencies in Block S310. In one implementation in which the user device is operating in a 5G network, the user device can access a multicarrier reference signal that a PRS specified by the 5G standard. Thus, the user device can identify multicarrier downlink signals intended for localization of the user device.

In an analogous step to Block S120 of the method S100, the user device can receive a set of multicarrier downlink signals, each multicarrier downlink signal in the set of multicarrier downlink signals: transmitted by a transceiver in a set of transceivers; defining the set of subcarrier frequencies; and comprising a subcarrier downlink signal for each subcarrier frequency in the set of subcarrier frequencies in Block S320. Assuming the user device has remained approximately stationary (e.g., within a few meters) while receiving each multicarrier downlink signal and that negligible (e.g., less than 10 nanoseconds) of clock drift have occurred at the user device, the user device can execute subsequent Blocks of the method S300 to localize itself relative to the set of transceivers.

In an analogous step to Block S140 of the method S100, the user device can, for each multicarrier downlink signal in the set of multicarrier downlink signals and for each subcarrier frequency in the set of subcarrier frequencies, calculate a phase difference between the subcarrier reference signal for the subcarrier frequency and a subcarrier downlink signal for the subcarrier frequency in Block S330. More specifically, the user device can calculate the set of phase differences for the set of subcarrier frequencies according to steps described above with respect to Blocks S140. Thus, the user device can generate a set of phase differences for each multicarrier downlink signal received at the user device.

In an analogous step to Block S160 and S162 of the method S100, the user device can, for each multicarrier downlink signal received at the user device and for each pair of subcarrier frequencies in the set of subcarrier frequencies, calculate a TOA estimate in a set of TOA estimates based on: a first phase difference for a first subcarrier frequency in the pair of subcarrier frequencies; and a second phase difference for a second subcarrier frequency in the pair of subcarrier frequencies in Block S340. Thus, as described above with respect to Block S162, the user device can cancel out the constant frequency-independent phase offset, $\theta_c$, and the RF carrier phase offset, $\theta_{fc}(f_c,\tau_m)$, from the TOA estimate, $\tau_m$, calculation.

In an analogous step to Block S164 of the method S100, the user device can, for each multicarrier downlink signal received at the user device, calculate the TOA of the multicarrier downlink signal at the receiving device based on the set of TOA estimates in Block S350 in order to mitigate the phase distortion affecting each multicarrier downlink signal, such as by calculating an average or weighted average of the TOA estimates. Alternatively, in an analogous step to Block S222, the user device can calculate a TDOA based on TOA estimates associated with the same pair of subcarrier frequencies to generate a TDOA estimate for each pair of subcarrier frequencies in the set of subcarrier frequencies. In this alternative implementation, the user device can then execute an average or weighted average of this set of TDOA estimates in order to calculate the TDOA estimate between a pair of multicarrier downlink signals received by the user device.

In an analogous step to Block S220 and S230 of the method S200, the user device can calculate a downlink location estimate of the user device based on the TOA of each multicarrier downlink signal in the set of multicarrier downlink signals and a set of known locations of the set of transceivers in Block S360. In one implementation, in a step similar to Block S220, the user device generates a set of TDOAs based on the set of TOAs corresponding to each multicarrier downlink signal received by the user device. Subsequently, in a step similar to Block S230, the user device can calculate the downlink location estimate based on TDOA multilateration. Alternatively, the user device can execute TOA multilateration to calculate the downlink location estimate.

10. Uplink-Downlink Hybrid Variation

In another variation, the location management server can execute a hybrid uplink-downlink variation in order to further improve the accuracy of the localization calculation for the user by leveraging the frequency diversity of uplink and downlink signals. In some network protocols, uplink and downlink signals are separated in frequency (e.g., by hundreds of megahertz), therefore these signals are likely to experience significantly different multipath and noise environments. Thus, by utilizing both types of signals the location management server can increase the accuracy of the location estimate for the user device.

In this variation, the set of transceivers and the location management server can execute Blocks of the method S100 and S200 respectively to generate an uplink location estimate for the user device. Concurrently or within a short time period (e.g., within one TDMA time slot), the user device can execute Blocks of the method S300 to generate a downlink location estimate. The user device can then transmit the downlink location estimate to the location management server, which can then average or otherwise combine (via a super-resolution algorithm) the uplink location estimate and the downlink location estimate into a hybrid location estimate for the user device. More specifically, the location management server can: access, from the user device, a downlink location estimate for the user device, the downlink location estimate calculated by the user device based on a set of multicarrier downlink signals transmitted from the set of transceivers to the user device; and calculate a hybrid location estimate based on the uplink location estimate and the downlink location estimate.

Figure 9:
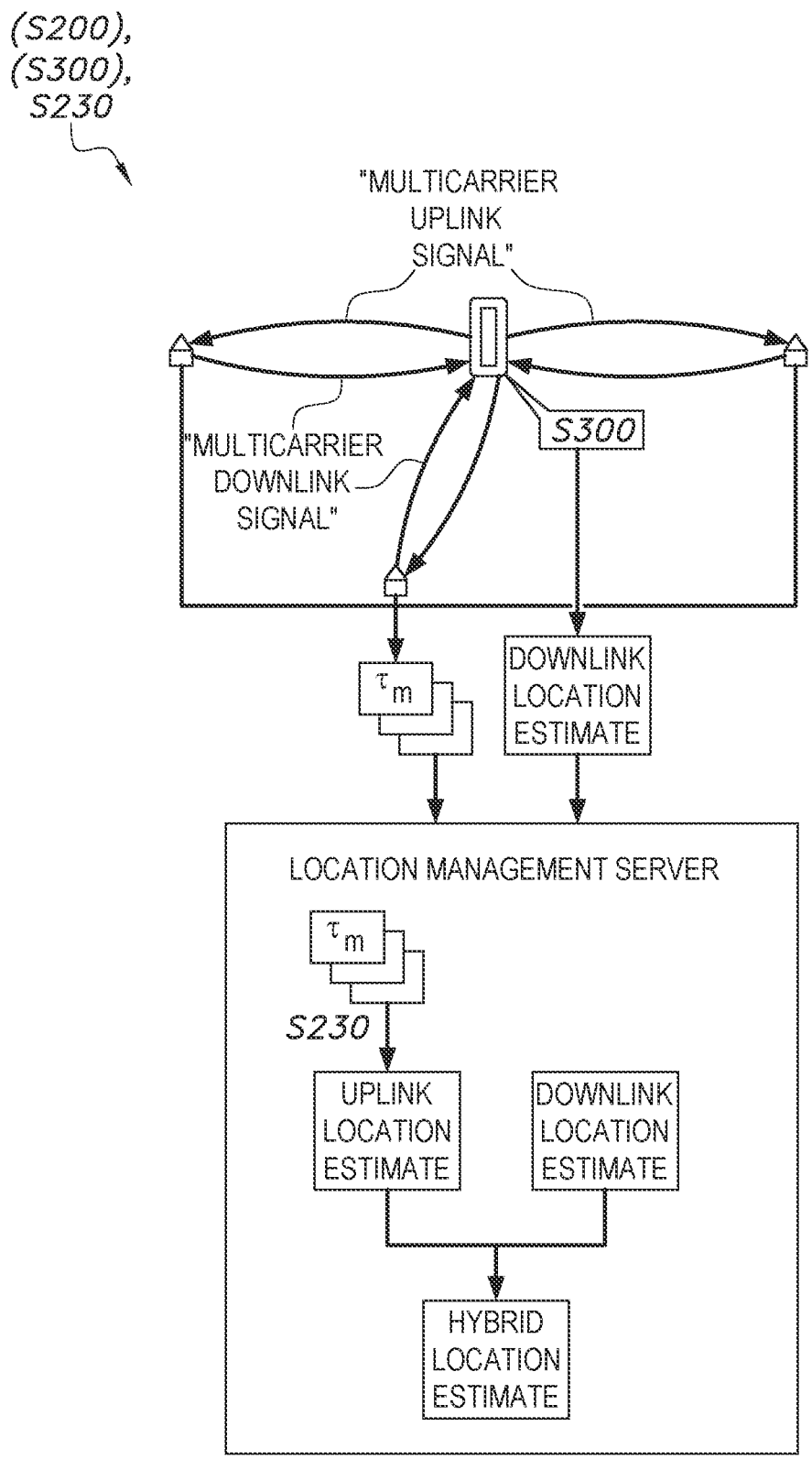
FIG. 9 is a flowchart representation of one variation of the second method and the third method.

As shown in FIG. 9, the location management server can access, from the user device, the downlink location estimate for the user device, the downlink location estimate calculated by the user device based on a set of multicarrier downlink signals transmitted from the set of transceivers to the user device.

Figure 8:
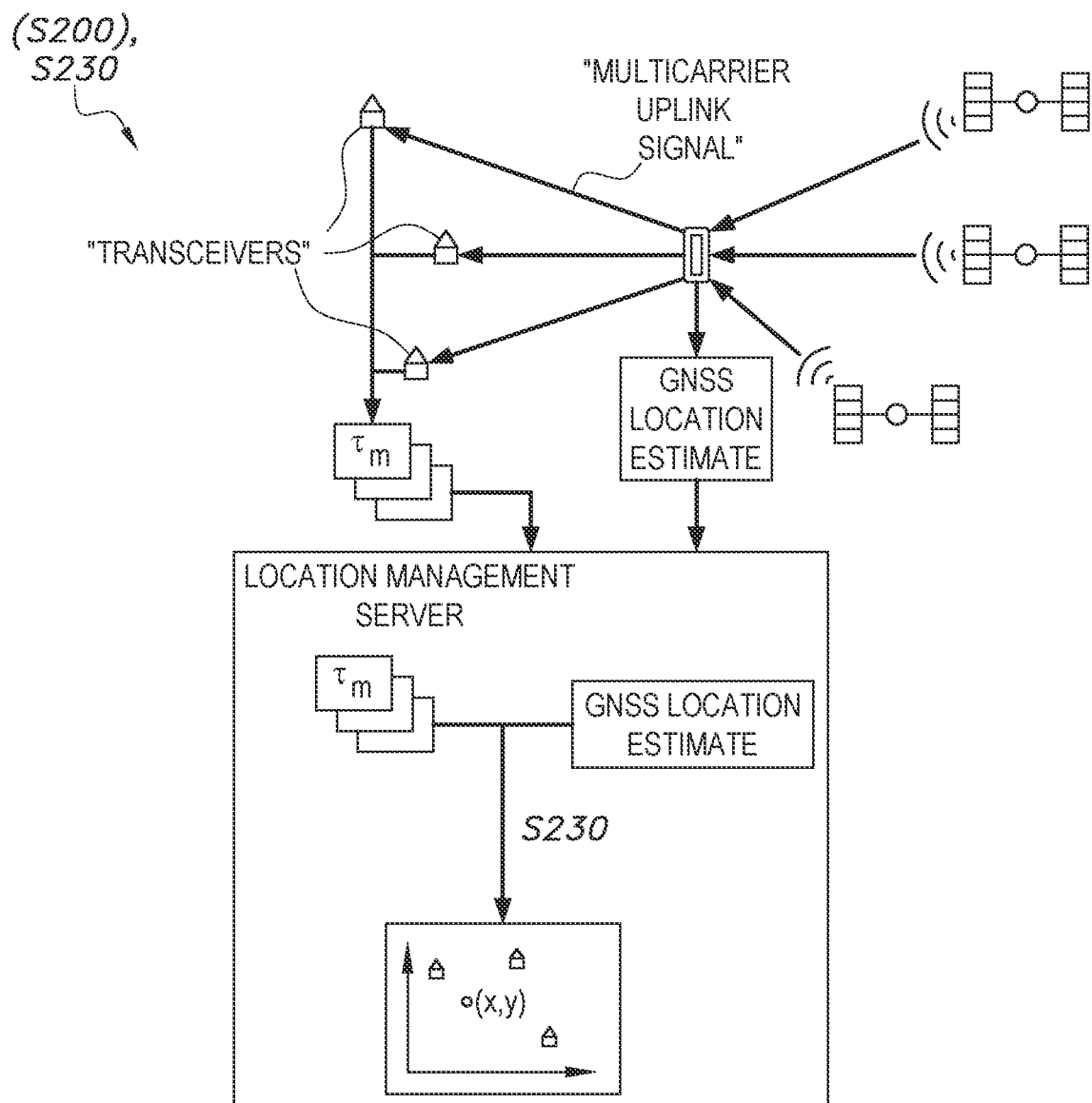
FIG. 8 is a flowchart representation of one variation of the second method.

As shown in FIG. 8, the user device (in addition to or instead of calculating the downlink location estimate via Blocks of the method S300) can utilize a GNSS localization system to generate a downlink location estimate. Thus, the location management server can access, from the user device, the downlink location estimate calculated by the user device based on a global navigation satellite system in communication with the user device.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for calculating a location of a user device comprising:

for a first transceiver in a set of transceivers:
 accessing a first time-of-arrival of a first multicarrier uplink signal, transmitted from the user device, at the first transceiver, the first time-of-arrival calculated by:
  receiving the first multicarrier uplink signal comprising a first subcarrier uplink signal for a first subcarrier frequency in a set of subcarrier frequencies;
  calculating a first phase difference between the subcarrier uplink signal and a first corresponding subcarrier reference signal;
  calculating a first phase offset based on the first subcarrier frequency and a first calibration function for the first transceiver;

calculating a first adjusted phase difference for the first multicarrier uplink signal based on the first phase difference and the first phase offset; and calculating the first time-of-arrival of the first multicarrier uplink signal based on the first adjusted phase difference for the first multicarrier uplink signal; and calculating a first time-differences-of-arrival based on the first time-of-arrival of the first multicarrier uplink signal; and calculating an uplink location estimate of the user device based on the first time-differences-of-arrival and a location of each transceiver in the set of transceivers.

2. The method of claim 1:

further comprising, for a second transceiver in the set of transceivers, accessing a second time-of-arrival of a second multicarrier uplink signal, transmitted from the user device, at the second transceiver, the second time-of-arrival calculated by:

receiving the second multicarrier uplink signal comprising a second subcarrier uplink signal for a second subcarrier frequency in the set of subcarrier frequencies;

calculating a second phase difference between the second subcarrier uplink signal and a second corresponding subcarrier reference signal;

calculating a second phase offset based on the second subcarrier frequency and a second calibration function for the second transceiver;

calculating a second adjusted phase difference for the second multicarrier uplink signal based on the second phase difference and the second phase offset; and calculating the second time-of-arrival of the second multicarrier uplink signal based on the adjusted phase difference for the second multicarrier uplink signal; and wherein calculating the first time-differences-of-arrival comprises calculating the first time-differences-of-arrival further based on the first time-of-arrival of the first multicarrier uplink signal and the second time-of-arrival of the second multicarrier uplink signal.

3. The method of claim 1, further comprising:

based on an identifier associated with the first transceiver, accessing a transceiver-specific calibration function representing a relationship between subcarrier frequency and phase offset for the first transceiver; and at the first transceiver in the set of transceivers, calculating the first adjusted phase difference between the first subcarrier uplink signal and the first corresponding subcarrier reference signal by:

calculating the first phase offset based on the first subcarrier frequency and the transceiver-specific calibration function; and reducing the phase difference by the phase offset to generate the adjusted phase difference.

4. The method of claim 1, further comprising, at the first transceiver in the set of transceivers, calculating the first time-of-arrival of the first multicarrier uplink signal by:

calculating a time-of-arrival estimate, in a set of time-of-arrival estimates, for the first multicarrier uplink signal based on a pair of phase differences corresponding to a pair of subcarrier frequencies; and calculating the first time-of-arrival of the first multicarrier uplink signal based on the set of time-of-arrival estimates.

5. The method of claim 4, wherein calculating the time-of-arrival estimate, in the set of time-of-arrival estimates, for the first transceiver comprises calculating the time-of-arrival estimate based on:

the first phase difference for the first subcarrier frequency in the pair of subcarrier frequencies; and a second phase difference for a second subcarrier frequency in the pair of subcarrier frequencies.

6. The method of claim 4, wherein calculating the first time-of-arrival of the first multicarrier uplink signal comprises, for the first transceiver in the set of transceivers, calculating a weighted average of the set of time-of-arrival estimates, calculated for the first multicarrier uplink signal, based on a pair of phase distortions associated with the pair of subcarrier frequencies.

7. The method of claim 1, further comprising, at the first transceiver, calculating the first phase difference between the subcarrier uplink signal and the first corresponding subcarrier reference signal by:

for the first subcarrier frequency in the set of subcarrier frequencies:

calculating the first phase difference between each subcarrier uplink signal for the subcarrier frequency and a corresponding subcarrier reference signal for the transceiver.

8. A method for calculating a location of a user device comprising:

for a first transceiver in a set of transceivers:

accessing a first time-of-arrival of a first multicarrier uplink signal, transmitted from the user device, at the transceiver, the first time-of-arrival calculated by:

receiving the first multicarrier uplink signal comprising a first subcarrier uplink signal for a first subcarrier frequency;

calculating a first phase difference between the subcarrier uplink signal and a first corresponding subcarrier reference signal;

calculating a first phase offset based on a calibration function for the transceiver;

calculating a first adjusted phase for the first multicarrier uplink signal based on the first phase difference and the first phase offset; and calculating the first time-of-arrival of the first multicarrier uplink signal based on the adjusted phase difference for the first multicarrier uplink signal; and calculating a time-differences-of-arrival based on the first time-of-arrival of the first multicarrier uplink signal; and calculating an uplink location estimate of the user device based on the time-differences-of-arrival and a location of the first transceiver in the set of transceivers.

9. The method of claim 8, further comprising, at the first transceiver in the set of transceivers, calculating the first adjusted phase difference between the first subcarrier uplink signal and the first corresponding subcarrier reference signal comprises calculating the first adjusted phase difference by:

calculating the first phase offset based on the first subcarrier frequency and a transceiver-specific calibration function representing a relationship between subcarrier frequency and phase offset for the first transceiver; and reducing the phase difference by the phase offset to generate the adjusted phase difference.

10. A method for calculating a location of a user device comprising:
for a first transceiver in a set of transceivers:
accessing a first time-of-arrival of a first multicarrier uplink signal, transmitted from the user device, at the transceiver, the first time-of-arrival calculated by:
receiving the first multicarrier uplink signal comprising a first subcarrier uplink signal for a first subcarrier frequency;
calculating a first phase difference between the subcarrier uplink signal and a first corresponding subcarrier reference signal;
calculating a first adjusted phase for the first multicarrier uplink signal based on the first phase difference; and
calculating the first time-of-arrival of the first multicarrier uplink signal based on the adjusted phase difference for the first multicarrier uplink signal; and
calculating a time-differences-of-arrival based on the first time-of-arrival of the first multicarrier uplink signal; and
calculating an uplink location estimate of the user device based on the time-differences-of-arrival and a location of the first transceiver in the set of transceivers.

11. The method of claim 10, further comprising, for the first transmitter in the set of transmitters:
calculating the first time-of-arrival of the first multicarrier uplink signal further based on a phase offset between a calibration function for the transceiver and the first subcarrier frequency.

* * * * *